(12) United States Patent  
Ishikawa

(10) Patent No.: US 8,332,173 B2  
(45) Date of Patent: Dec. 11, 2012

(54) COORDINATE MEASURING MACHINE

(75) Inventor: Nobuhiro Ishikawa, Best (NL)

(73) Assignee: Mitutoyo Corporation, Kawasaki-shi (JP)

( * ) Notice: Subject to any disclaimer, the term of this patent is extended or adjusted under 35 U.S.C. 154(b) by 482 days.

(21) Appl. No.: 12/453,245

(22) Filed: May 4, 2009

(65) Prior Publication Data

US 2009/0287444 A1 Nov. 19, 2009

(30) Foreign Application Priority Data

May 13, 2008 (JP) .................................. 2008-125980

(51) Int. Cl.
*G01C 17/38* (2006.01)
*G01P 21/00* (2006.01)

(52) U.S. Cl. ............. 702/95; 702/94; 702/150; 702/155

(58) Field of Classification Search .............. 702/94–95, 702/150–155

See application file for complete search history.

(56) References Cited

U.S. PATENT DOCUMENTS

| 7,685,726 | B2 * | 3/2010 | Fuchs et al. ........................ 33/503 |
| 2002/0189319 | A1 * | 12/2002 | Abbe .............................. 73/1.01 |
| 2003/0019119 | A1 * | 1/2003 | Sato et al. ........................ 33/503 |
| 2003/0069709 | A1 * | 4/2003 | Noda et al. ..................... 702/104 |
| 2005/0213108 | A1 * | 9/2005 | McMurtry et al. ............. 356/609 |
| 2007/0028677 | A1 * | 2/2007 | McFarland et al. .............. 73/105 |
| 2008/0065341 | A1 * | 3/2008 | Ishikawa et al. ................. 702/95 |
| 2009/0025463 | A1 * | 1/2009 | McFarland et al. ............. 73/104 |
| 2009/0082986 | A1 * | 3/2009 | Pettersson ....................... 702/95 |

FOREIGN PATENT DOCUMENTS

| JP | A-7-324928 | 12/1995 |
| JP | A-2008-89578 | 4/2008 |

* cited by examiner

*Primary Examiner* — Eliseo Ramos Feliciano
*Assistant Examiner* — Yaritza H Perez Bermudez
(74) *Attorney, Agent, or Firm* — Oliff & Berridge, PLC

(57) ABSTRACT

A coordinate measuring machine includes: a probe provided with a measurement piece; a moving mechanism that effects a scanning movement of the probe; and a host computer for controlling the moving mechanism. The host computer includes a displacement acquiring unit for acquiring a displacement of the moving mechanism and a measurement value calculating unit for calculating a measurement value. The measurement value calculating unit includes a correction-amount calculating unit for calculating a correction amount for correcting a position error of the measurement piece and a correcting unit for correcting the position error of the measurement piece based on the displacement of the moving mechanism and the correction amount. The correction-amount calculating unit calculates a translation-correction amount for correcting a translation error of the probe at a reference point on the probe and a rotation-correction amount for correcting a rotation error of the probe according to a rotation angle of the probe around the reference point and a length of the probe from the reference point to the measurement piece.

12 Claims, 18 Drawing Sheets

COORDINATE MEASURING MACHINE

BACKGROUND OF THE INVENTION

1. Field of the Invention

The present invention relates to a coordinate measuring machine.

2. Description of Related Art

A coordinate measuring machine typically includes a probe having a measurement piece that is moved along a surface of an object to be measured, a moving mechanism that holds and moves the probe while scanning the surface and a controller for controlling the moving mechanism (see, for instance, Document 1: JP-A-2008-89578).

In such a coordinate measuring machine, a displacement of the moving mechanism is obtained to detect the position of the measurement piece, based on which a surface profile of the object and the like is measured.

However, since the moving mechanism is deformed on account of acceleration caused during the scanning movement of the probe, an error occurs between the obtained displacement of the moving mechanism and the position of the measurement piece, resulting in an error in the measurement value of the coordinate measuring machine.

Accordingly, in a surface profile measuring instrument (coordinate measuring machine) disclosed in the Document 1, an acceleration of the scanning movement of the probe is calculated based on a scanning vector (a command value for the scanning movement of the probe). Then, a correction-amount for correcting the position error of the measurement piece caused on account of the deformation of the driving mechanism (moving mechanism) is calculated based on the calculated acceleration.

Incidentally, in order to accept various profiles of objects to be measured, a multiple number of probes are exchangeably attached to such a typical coordinate measuring machine. Further, a probe that is rotated relative to the moving mechanism to change the attitude thereof has come to be recently used.

In the surface profile measuring instrument disclosed in Document 1, the correction amount for correcting the position error of the measurement piece is calculated based on the acceleration of the driving mechanism considering solely of the deformation of the driving mechanism. Accordingly, the same correction amount is calculated when, for instance, probes of different lengths are used or when the attitude of a probe is changed.

However, when probes of different lengths are used, the position of the measurement piece is altered even when the deformation of the moving mechanism is equal. When the attitude of the probe is changed, the position of the measurement piece relative to the driving mechanism is altered. Accordingly, the surface profile measuring instrument disclosed in the Document 1 fails to calculate an appropriate correction amount in the above circumstances, thus unable to properly correct an error in the measurement value.

SUMMARY OF THE INVENTION

An object of the invention is to provide a coordinate measuring machine that is capable of properly correcting an error in a measurement value even when probes of different lengths are used or when an attitude of a probe is changed.

A coordinate measuring instrument according to an aspect of the invention includes: a probe that has a measurement piece that moves along a surface of an object; a moving mechanism that holds the probe and effects a scanning movement of the probe; and a controller that controls the moving mechanism, the controller including: a displacement acquiring unit that acquires a displacement of the moving mechanism; a correction-amount calculating unit that calculates a correction amount for correcting a position error of the measurement piece caused by the scanning movement of the probe; and a correcting unit that corrects the position error of the measurement piece based on the displacement of the moving mechanism acquired by the displacement acquiring unit and the correction amount calculated by the correction-amount calculating unit, the correction-amount calculating unit calculating: a translation-correction amount for correcting a translation error of the probe at a reference point on the probe; and a rotation-correction amount for correcting a rotation error of the probe generated according to a rotation angle of the probe around the reference point and a length of the probe from the reference point to the measurement piece.

According to the above arrangement, since the coordinate measuring machine includes the correction-amount calculating unit for separately calculating the translation-correction amount and the rotation-correction amount for correcting the position error of the measurement piece caused by the scanning movement of the probe, and the correcting unit for correcting the position error of the measurement piece based on the translation-correction amount and the rotation-correction amount calculated by the correction-amount calculating unit, the position error of the measurement piece caused on account of the deformation of the moving mechanism can be corrected. Incidentally, the translation-correction amount and the rotation-correction amount can be calculated based on the position, velocity, acceleration and the like of the scanning movement.

When the length or attitude of the probe differs (even with the same scale value), though the translation-correction amount calculated by the correction-amount calculating unit is approximately equal, the rotation-correction amount becomes different according to the length or the attitude of the probe. Accordingly, the correction-amount calculating unit is arranged so that an appropriate correction amount can be calculated even when the length of the probe differs or the attitude of the probe is changed. Consequently, the errors in the measurement value can be properly corrected by the coordinate measuring machine of the above aspect of the invention even in such cases.

Incidentally, the reference point on the probe is preferably a rotation center of the rotation of the probe relative to the moving mechanism when the attitude of the probe can be changed. By thus determining the reference point, the rotation-correction amount can be calculated by synthesizing the rotation angle of the probe relative to the moving mechanism when the attitude is changed and the rotation angle of the probe caused by the deformation of the moving mechanism.

In the above aspect, the correction-amount calculating unit preferably calculates at least one of the translation-correction amount and the rotation-correction amount based on an acceleration of the scanning movement of the probe.

According to the above arrangement, the coordinate measuring machine is capable of properly correcting an error in a measurement value even when probes of different length are used or when the attitude of the probe is changed. Incidentally, the acceleration of the scanning movement of the probe may be calculated based on a scanning vector as in the surface profile measuring instrument disclosed in the Document 1, or, alternatively, may be measured using an acceleration sensor, position sensor and the like.

In the above aspect of the invention, it is preferable that the moving mechanism includes a plurality of movement axes along which the scanning movement of the probe is effected, and the correction-amount calculating unit includes a phase difference correction-amount calculating unit that calculates a phase-difference correction-amount for correcting a phase difference between the respective movement axes.

An error sometimes occurs on a measurement value of a coordinate measuring machine provided with a plurality of movement axes for the scanning movement of the probe on account of an influence of the phase difference between the movement axes on account of a difference in the response characteristics of the respective movement axes. Specifically, when a command value is outputted so that the probe is circulated at a constant angular velocity within a plane including two movement axes and the scanning movement of the probe is effected by the moving mechanism, the measurement value may be influenced by the phase difference between the two movement axes to show an ellipsoidal profile.

According to the above arrangement, since the coordinate measuring machine includes the phase-difference correction-amount calculating unit for calculating the phase-difference correction-amount for correcting the phase difference between the respective movement axes, the phase difference between the respective movement axes can be properly corrected, thus further properly correcting the error in the measurement value.

In the above aspect of the invention, it is preferable that the phase difference correction-amount calculating unit calculates the phase-difference correction-amount based on a frequency of the scanning movement when the probe is circulated at a constant angular velocity.

The phase difference between the respective movement axes depends on the velocity of the scanning movement of the probe, i.e. the frequency.

Since the phase difference correction-amount calculating unit calculates the phase difference correction-amount based on the frequency of the scanning movement when the probe is circulated at a constant angular velocity, the coordinate measuring machine can properly correct the phase difference between the respective movement axes, thereby further properly correcting the error in the measurement value. Incidentally, the frequency of the scanning movement of the probe may be calculated based on a scanning vector as in the surface profile measuring instrument disclosed in the Document 1, or, alternatively, may be detected using an acceleration sensor, position sensor and the like.

In the above aspect of the invention, it is preferable that the correction-amount calculating unit calculates the correction amount based on the displacement of the moving mechanism acquired by the displacement acquiring unit.

In a coordinate measuring machine provided with a moving mechanism having a movement axis for a scanning movement of a probe, a position error of a measurement piece varies depending on the measurement position, i.e. the displacement of the moving mechanism.

Since the correction-amount calculating unit of the above arrangement calculates the correction amount based on the displacement of the moving mechanism obtained by the displacement acquiring unit, the coordinate measuring machine can properly correct the error in the measurement value.

DETAILED DESCRIPTION OF PREFERRED EMBODIMENT(S)

First Embodiment

A first exemplary embodiment of the invention will be described below with reference to the drawings.

Overall Arrangement of Coordinate Measuring Machine

Figure 1:
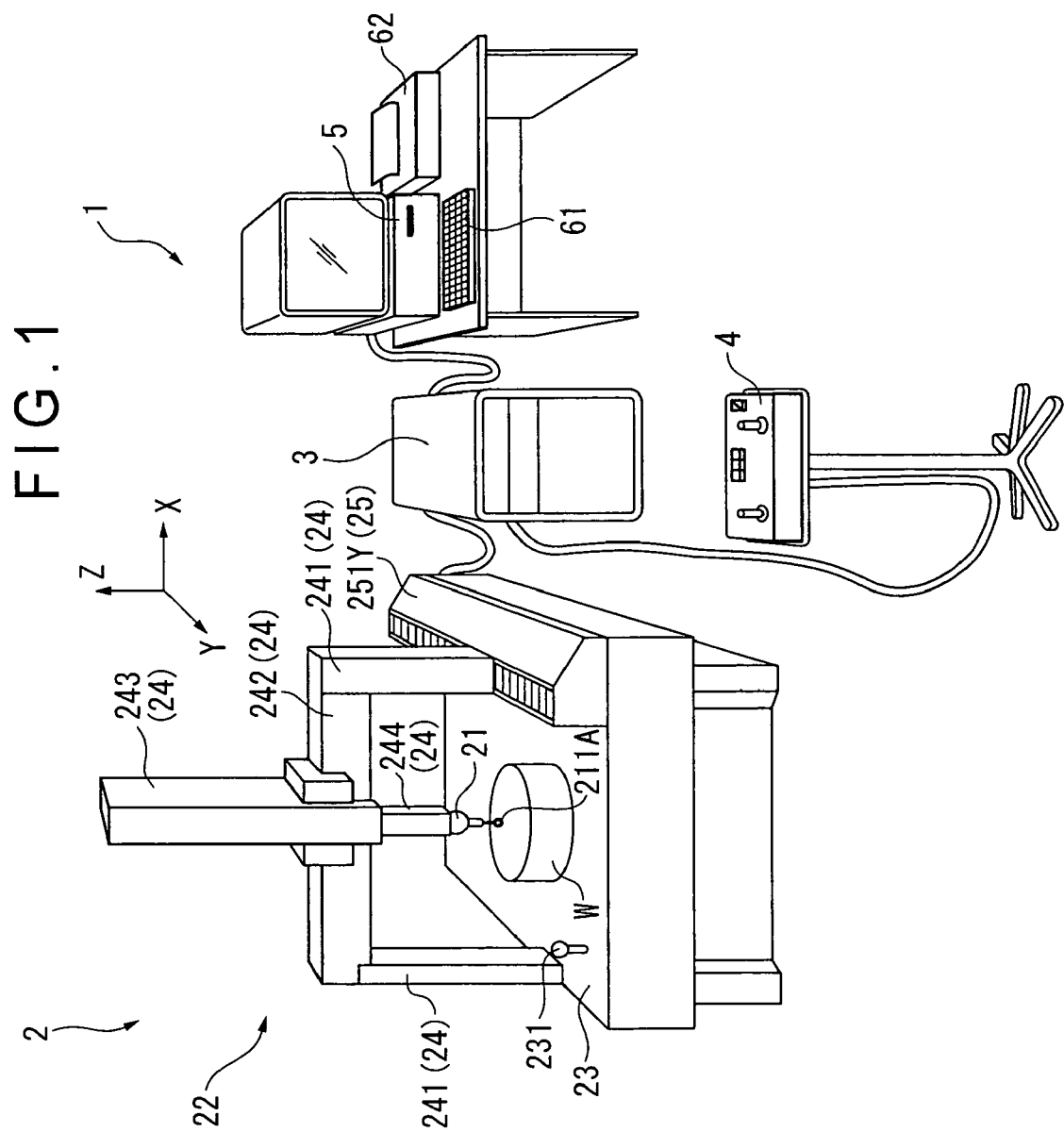
FIG. 1 is a schematic illustration showing an entire coordinate measuring machine according to a first exemplary embodiment of the invention.
Figure 2:
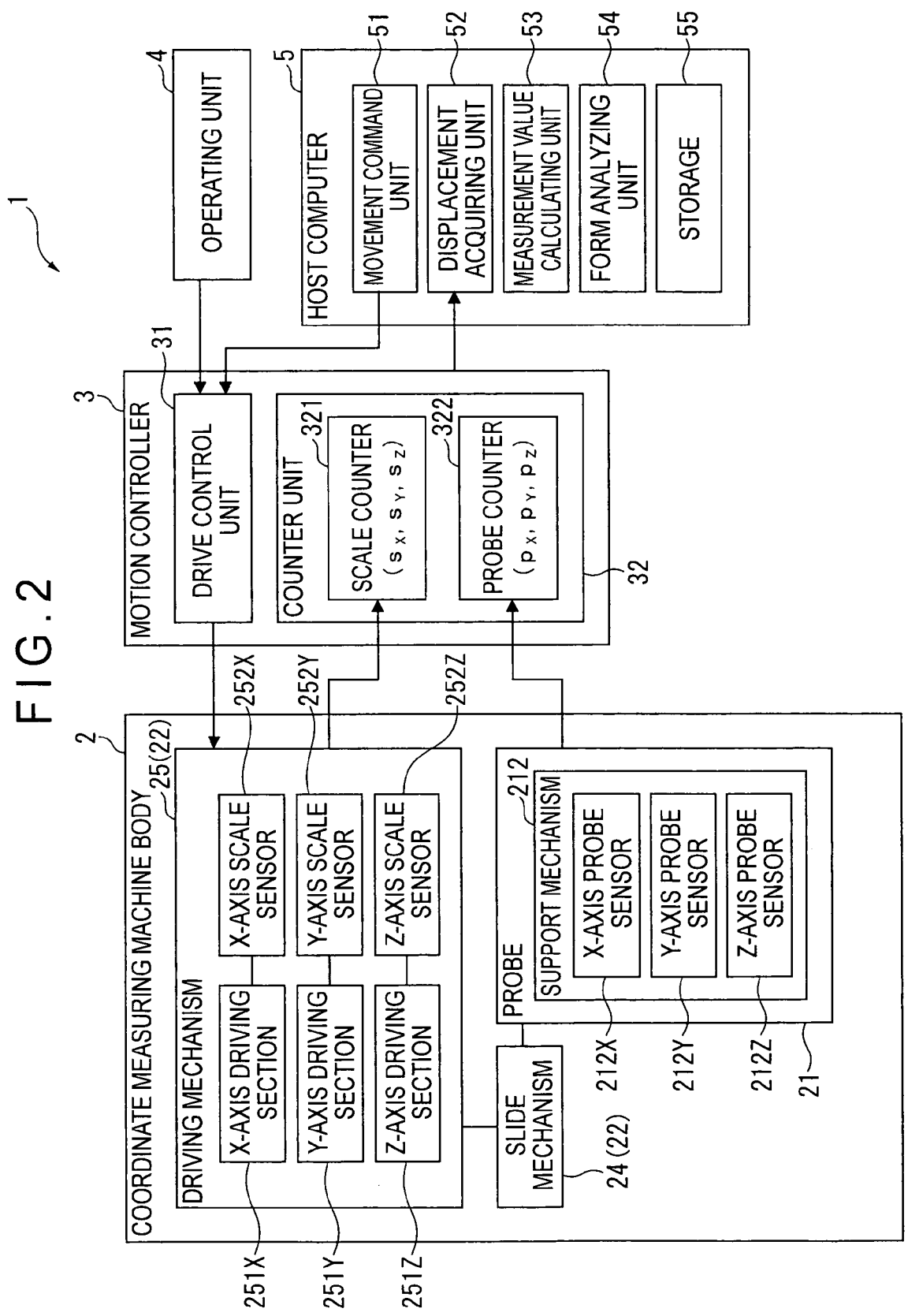
FIG. 2 is a block diagram schematically showing an overall arrangement of the coordinate measuring machine according to the above exemplary embodiment.

FIG. 1 is a schematic illustration showing an entire coordinate measuring machine according to the first exemplary embodiment of the invention. FIG. 2 is a block diagram showing an overall arrangement of a coordinate measuring machine 1. Incidentally, an upward direction is defined as +Z-axis direction and two axes orthogonal to the Z-axis are respectively defined as X-axis and Y-axis in FIG. 1, which is the same in the subsequent drawings.

As shown in FIG. 1, the coordinate measuring machine 1 includes: a coordinate measuring machine body 2; a motion controller 3 for controlling the drive of the coordinate measuring machine body 2; an operating unit 4 that applies a command to the motion controller 3 through an operation lever and the like to manually operate the coordinate measuring machine body 2; a host computer 5 that feeds a predetermined command to the motion controller 3 and performs arithmetic processing such as form analysis of an object W to be measured that is placed on the coordinate measuring machine body 2; and an input unit 61 and an output unit 62 connected to the host computer 5. Incidentally, the input unit 61 inputs a measurement condition and the like of the coordinate measuring machine 1 to the host computer 5. The output unit 62 outputs the measurement result of the coordinate measuring machine 1.

The coordinate measuring machine body 2 includes: a probe 21 provided at a distal end (−Z-axis direction end) with a measurement piece 211A to be brought into contact with the surface of the object W; a moving mechanism 22 that holds a base end (+Z-axis direction end) of the probe 21 and moves the probe 21; and a measurement stage 23 on which the moving mechanism 22 is vertically provided. Incidentally, a reference ball 231 of which radius is known is placed on the measurement stage 23 in order to calibrate the coordinate measuring machine body 2. The reference ball 231 is adapted to be placed at a plurality of locations on the measurement stage 23.

The moving mechanism 22 includes: a slide mechanism 24 that holds the base end of the probe 21 to allow a slide movement of the probe 21; and a driving mechanism 25 that drives the slide mechanism 24 to move the probe 21.

The slide mechanism 24 includes: two beam supports 241 extending from both sides of the measurement stage 23 in the +Z-axis direction, the beam supports 241 being slidable along the Y-axis direction; a beam 242 supported by the beam supports 241 to extend along the X-axis direction; a tubular column 243 extending along the Z-axis direction, the column 243 being slidable along the X-axis direction on the beam 242; and a slider 244 inserted into the inside of the column 243 in a manner slidable along the Z-axis direction. Accordingly, the moving mechanism 22 includes a plurality of movement axes for moving the probe 21 in the X, Y, Z-axis directions. The slider 244 holds the base end of the probe 21 at an end in the −Z-axis direction thereof. A plurality of probes are prepared for the probe 21, one of which is selected to be held by the slider 244.

As shown in FIGS. 1 and 2, the driving mechanism 25 includes: a Y-axis driving section 251Y that supports one of the beam supports 241 on +X-axis direction side in a manner slidably movable along the Y-axis direction; an X-axis driving section 251X (not shown in FIG. 1) that slidably moves the column 243 on the beam 242 in the X-axis direction; and a Z-axis driving section 251Z (not shown in FIG. 1) that slides the slider 244 in the column 243 to move the slider 244 in the Z-axis direction.

As shown in FIG. 2, the X-axis driving section 251X, the Y-axis driving section 251Y and the Z-axis driving section 251Z are respectively provided with an X-axis scale sensor 252X, a Y-axis scale sensor 252Y and a Z-axis scale sensor 252Z for detecting the position of the column 243, the beam supports 241 and the slider 244 in the respective axis-directions. Incidentally, the scale sensors 252X, 252Y and 252Z are position sensors that output pulse signals corresponding to the displacement of the column 243, the beam supports 241 and the slider 244.

Figure 3:
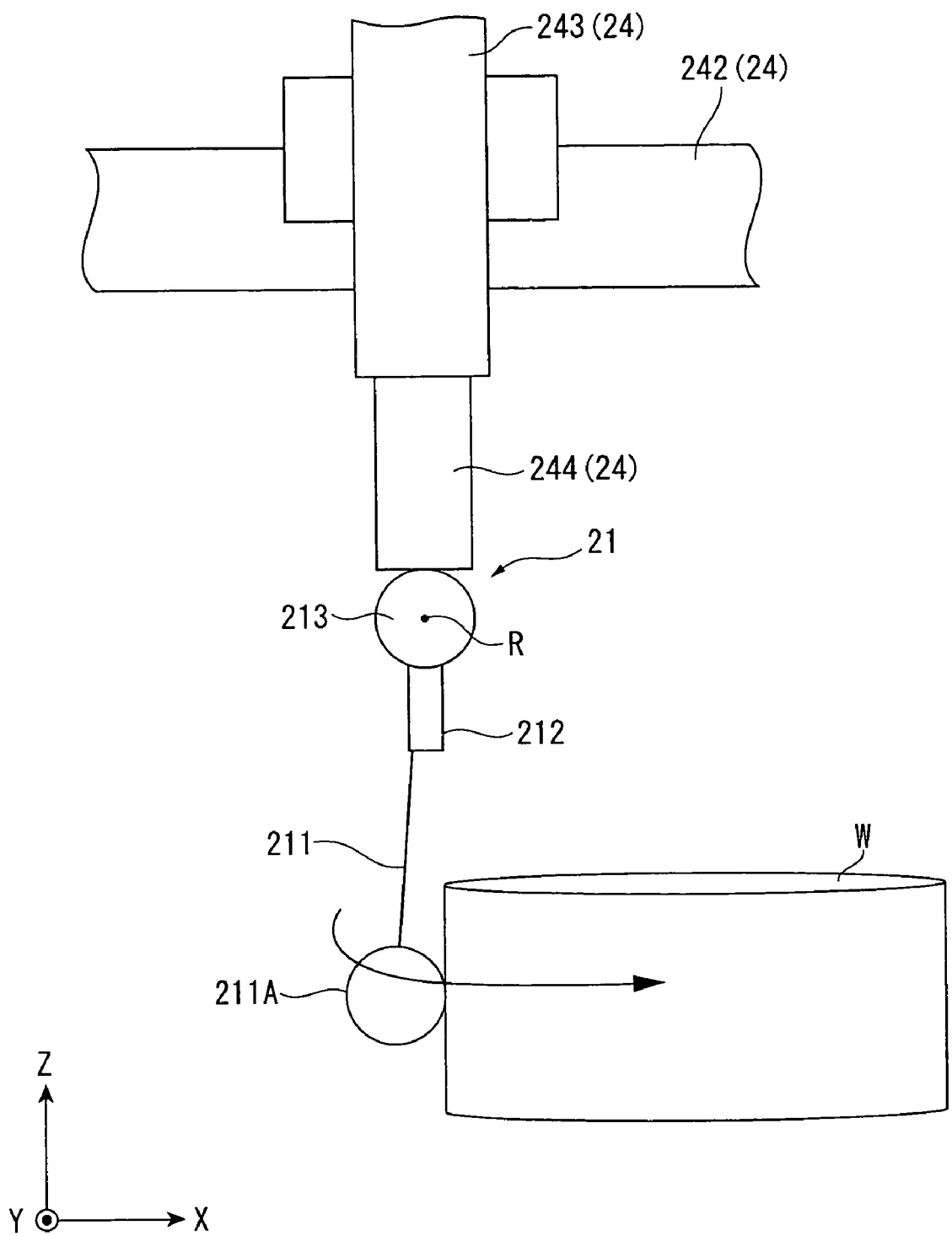
FIG. 3 is an enlarged schematic illustration showing a portion of a slider at which a probe is held in the above exemplary embodiment.

FIG. 3 is an enlarged schematic illustration showing a portion of the slider 244 at which the probe 21 is held.

As shown in FIG. 3, the probe 21 includes a stylus 211 provided with the measurement piece 211A at a distal end thereof; a support mechanism 212 that supports a base end of the stylus 211 and a rotation mechanism 213 that allows a rotation of the support mechanism 212 relative to the slider 244.

The support mechanism 212 supports the stylus 211 while forcing the stylus 211 in the respective X, Y and Z-axis directions to be located at a predetermined position and, when an external force is applied (i.e. when the stylus 211 comes into contact with the object W), allows a displacement of the stylus 211 in the respective X, Y and Z-axis directions within a predetermined range. As shown in FIG. 2, the support mechanism 212 includes an X-axis probe sensor 212X, a Y-axis probe sensor 212Y and a Z-axis probe sensor 212Z for detecting the position of the stylus 211 in the respective axis-directions. The probe sensors 212 are position sensors that output pulse signals corresponding to the displacement of the stylus 211 in the respective axis-directions in the same manner as the scale sensors 252.

The rotation mechanism 213 is a mechanism that rotates the support mechanism 212 and the stylus 211 to alter the orientation of the probe 21 (defined by a direction from the base end to the distal end of the probe 21), i.e. the attitude of the probe 21. The rotation mechanism 213 allows the rotation of the support mechanism 212 and the stylus 211 around a reference point R with respect to the X, Y and Z-axes.

As shown in FIG. 2, the motion controller 3 includes: a drive control unit 31 that controls the driving mechanism 25 in response to the command from the operating unit 4 or the host computer 5; and a counter unit 32 that counts the pulse signals outputted from the scale sensors 252 and the probe sensors 212.

The counter unit 32 includes: a scale counter 321 that counts the pulse signals outputted from the scale sensors 252 to measure the displacement ($s_X$, $s_Y$, $s_Z$) of the slide mechanism 24; and a probe counter 322 that counts the pulse signals outputted from the probe sensors 212 to measure the displacement ($p_X$, $p_Y$, $p_Z$) of the stylus 211. The displacement (referred to as a scale value S hereinafter) of the slide mechanism 24 and the displacement of the stylus 211 (referred to as a probe value P hereinafter) respectively measured by the scale counter 321 and the probe counter 322 are outputted to the host computer 5.

The host computer (controller) 5 includes a CPU (Central Processing Unit), memory and the like, which supplies a predetermined command to the motion controller 3 to control the coordinate measuring machine body 2. The host computer 5 is provided with a movement command unit 51, a displacement acquiring unit 52, a measurement value calculating unit 53, a form analyzing unit 54 and a storage 55.

The movement command unit 51 provides a predetermined command to the drive control unit 31 of the motion controller 3 to effect the scanning movement of the slide mechanism 24 of the coordinate measuring machine body 2. Specifically, the movement command unit 51 outputs a scanning vector as a command value indicating a moving direction and moving velocity of the scanning movement of the probe 21 while the measurement piece 211A is in contact with the surface of the object W. Incidentally, in this exemplary embodiment, the movement command unit 51 sequentially outputs the scanning vector so that the measurement piece 211A is moved at a constant angular velocity along a side of the object W while depicting a circular locus based on the profile data of the object W of a cylindrical shape.

The displacement acquiring unit 52 acquires the scale value S and the probe value P measured respectively by the scale counter 321 and the probe counter 322 at a predetermined sampling interval. In other words, the displacement acquiring unit 52 acquires the displacement of the moving mechanism 22.

The measurement value calculating unit 53 calculates a measurement value, i.e. the position of the measurement piece 211A based on the scale value S and the probe value P acquired by the displacement acquiring unit 52. Incidentally, the scale value S is adjusted to indicate the position of the measurement piece 211A when the probe 21 is oriented in the −Z-axis direction and the deformation of the slide mechanism 24 and the displacement of the stylus 211 within the support mechanism 212 on account of the scanning movement are not occurred.

The form analyzing unit 54 calculates surface profile of the object W by synthesizing the measurement value calculated by the measurement value calculating unit 53 and performs form analysis such as calculation of error, distortion and the like by comparing calculated the surface profile of the object W with the profile data.

The storage 55 stores the data used in the host computer 5, which is, for instance, measurement condition inputted through the input unit 61 and measurement result outputted through the output unit 62. Incidentally, the measurement condition inputted through the input unit 61 includes the profile data of the object W used by the movement command unit 51 and the form analyzing unit 54, and a sampling interval for acquiring the scale value S and the probe value P by the displacement acquiring unit 52.

Detailed Arrangement of Measurement Value Calculating Unit

Figure 4:
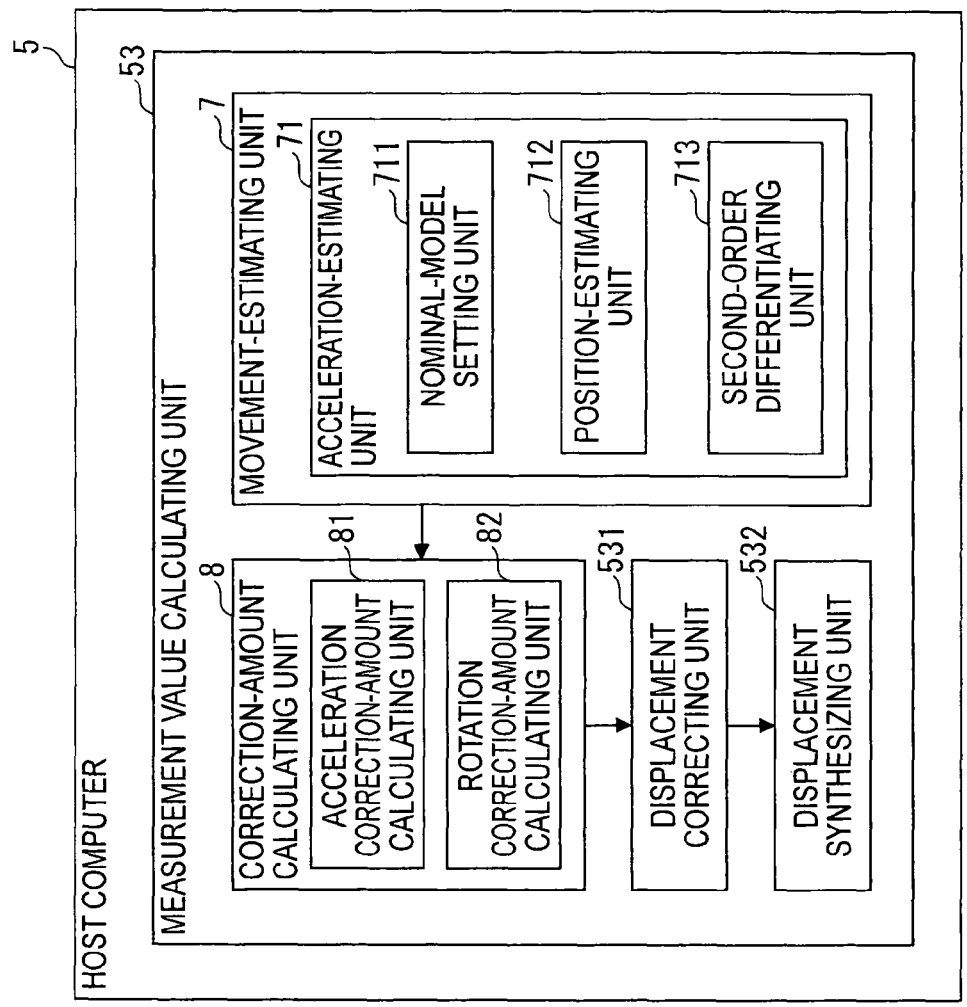
FIG. 4 is a block diagram showing a detailed arrangement of a measurement value calculating unit according to the above exemplary embodiment.

FIG. 4 is a block diagram showing a detailed arrangement of the measurement value calculating unit 53.

As shown in FIG. 4, the measurement value calculating unit 53 includes: a movement-estimating unit 7 including an acceleration-estimating unit 71 for estimating an acceleration of the scanning movement of the moving mechanism 22; a correction-amount calculating unit 8 for calculating a correction amount for correcting an error in the position of the measurement piece 211A generated by the scanning movement of the probe 21 based on the acceleration estimated by the acceleration-estimating unit 71; a displacement correcting unit 531 for correcting the scale value S acquired by the displacement acquiring unit 52 based on the correction amount calculated by the correction-amount calculating unit 8; and a displacement synthesizing unit 532 for calculating the measurement value by synthesizing the scale value S corrected by the displacement correcting unit 531 and the probe value P acquired by the displacement acquiring unit 52.

The acceleration-estimating unit 71 includes: a nominal-model setting unit 711 in which a nominal model represented by a transfer function from the output of the scanning vector by the movement command unit 51 to the acquisition of the scale value S and the probe value P by the displacement acquiring unit 52; a position-estimating unit 712 for estimating the position of the probe 21 based on the scanning vector and the nominal model; and a second-order differentiating unit 713 that calculates the acceleration of the scanning movement by applying a second-order derivative on the position of the probe 21 estimated by the position-estimating unit 712.

A nominal model $G_1(s)$ of the moving mechanism 22 and a nominal model $G_2(s)$ of the probe 21 are set in the nominal-model setting unit 711. A plurality of the nominal models $G_2(S)$ of the probe 21 are stored in advance in the storage 55 per each of the types of the probe, one of which corresponding to the probe to be used can be selected by the input unit 61.

The transfer function from the output of the scanning vector by the movement command unit 51 to the acquisition of the scale value S and the probe value P by the displacement acquiring unit 52 is represented by a product $G_N (=G_1(S) \times G_2(S))$ of the nominal model $G_1(s)$ of the moving mechanism 22 and the nominal model $G_2(S)$ of the probe 21.

Here, though the scanning vector, the scale value S and the like are represented for each of the respective X, Y and Z-axes, since the position control system (a position control system in which the scale value S is fed back to the scanning vector) of the moving mechanism 22 is adjusted so that all of time constants T of the transfer function in the respective axes are equalized, the nominal model $G_N$ is used as the transfer function in common to all of the respective axis-directions. Incidentally, the nominal model $G_N$ can be obtained by deriving a transfer function based on a design data of the moving mechanism 22 or a system identification based on experimental data.

For instance, when the nominal model $G_N$ is a first-order delay system, the nominal model $G_N$ can be represented by the following formula (1), where K represents a gain and s represents a Laplace operator.

$$G_N = K \cdot \frac{1}{1 + T \cdot s} \quad (1)$$

The position-estimating unit 712 estimates the position of the probe 21 based on a command value $C(c_X, c_Y, c_Z)$ of the scanning vector and the nominal model $G_N$. Specifically, as shown in the following formulae (2-1) and (2-2), the position-estimating unit 712 calculates the product of the command value C and the nominal model $G_N$ to calculate the estimated position $E(e_X, e_Y, e_Z)$ of the probe 21.

$$E = G_N \cdot C \quad (2\text{-}1)$$

$$\left.\begin{array}{l} e_X = G_N \cdot c_X \\ e_Y = G_N \cdot c_Y \\ e_Z = G_N \cdot c_Z \end{array}\right\} \quad (2\text{-}2)$$

As shown in following formulae (3-1) and (3-2), the second-order differentiating unit 713 applies a second-order derivative on the estimated position E of the probe 21 estimated by the position-estimating unit 712 to calculate an acceleration $A(a_X, a_Y, a_Z)$ of the scanning movement.

$$A(t) = \frac{d^2 E(t)}{dt^2} \quad (3\text{-}1)$$

$$\left.\begin{array}{l} a_X = \ddot{e}_X \\ a_Y = \ddot{e}_Y \\ a_Z = \ddot{e}_Z \end{array}\right\} \quad (3\text{-}2)$$

The correction-amount calculating unit 8 includes an acceleration correction-amount calculating unit 81 and a rotation correction-amount calculating unit 82.

The acceleration correction-amount calculating unit 81 calculates a correction amount for correcting the position error of the measurement piece 211A caused depending on the acceleration A of the scanning movement.

Figure 5:
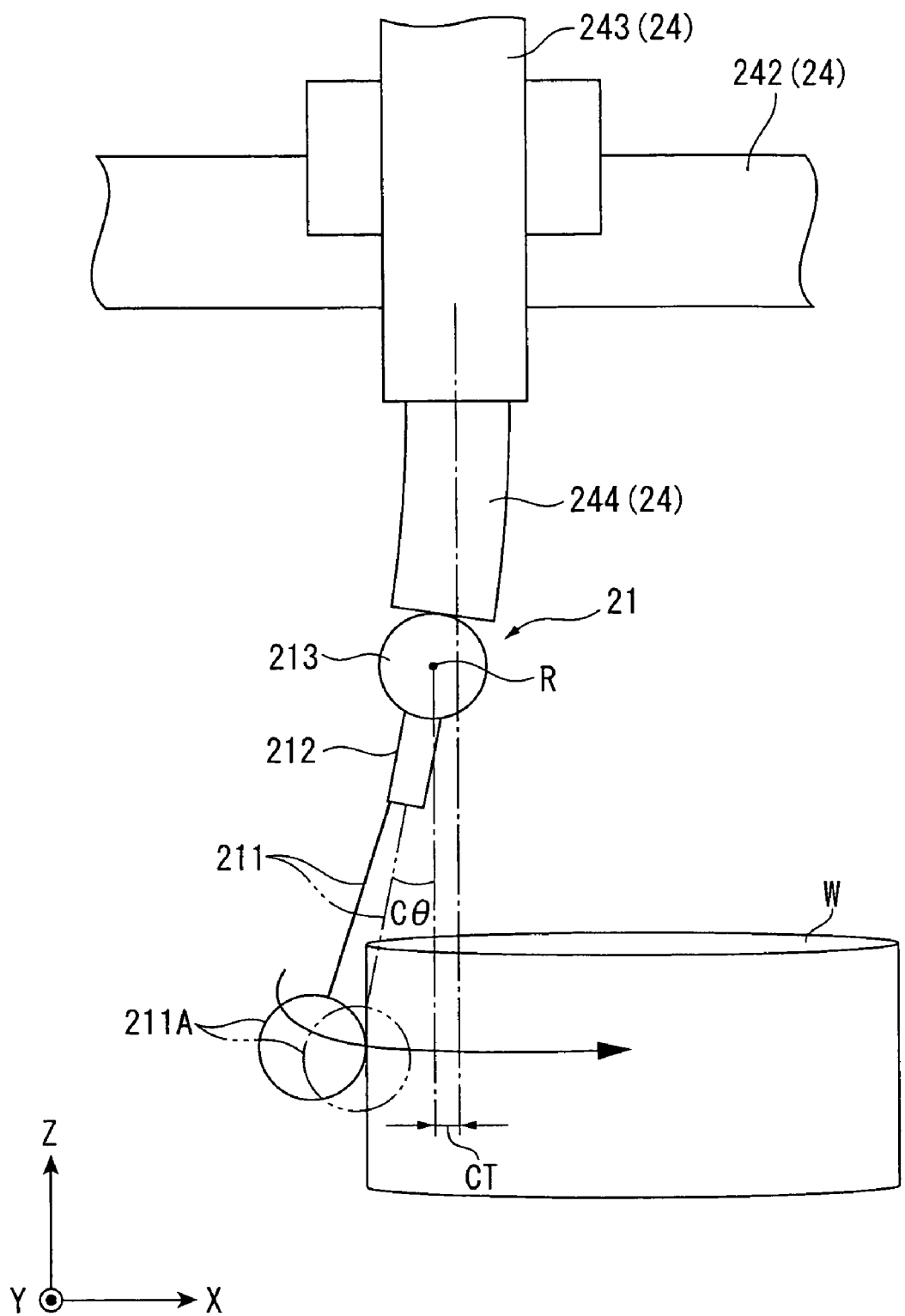
FIG. 5 is an illustration schematically showing a deformation of a slide mechanism caused on account of acceleration of a scanning movement in the above exemplary embodiment.

FIG. 5 is an illustration schematically showing a deformation of the slide mechanism 24 caused on account of the acceleration A of the scanning movement.

As shown in FIG. 5, when the measurement piece 211A is circulated at a constant angular velocity along a side of the object W to depict a circular locus, the slide mechanism 24 is deformed on account of the acceleration generated by the circular movement. Accordingly, the position obtained by synthesizing the scale value S and the probe value P is deviated from the actual position of the measurement piece 211A.

Then, the acceleration correction-amount calculating unit 81 calculates a translation-correction amount $CT(CT_X, CT_Y, CT_Z)$ for correcting a translation error of the probe 21 at the reference point R located on the base end of the probe 21 and a rotation angle $CO(C\theta_X, C\theta_Y, C\theta_Z)$ of the probe 21 around the reference point R according to the following formula (4) that is modeled as a quadratic expression of the acceleration A. Incidentally, in this exemplary embodiment, the rotation angles $\theta_X$, $\theta_Y$ and $\theta_Z$ are defined as an angle around the respective X, Y and Z-axes (rightward rotation being defined as forward direction), where the rotation angles $\theta_X$, $\theta_Y$ and $\theta_Z$ are counted from an origin respectively toward the +Y-axis direction, the +Z-axis direction and the +X-axis direction.

However, the formula (4) is classified according to the following conditional expressions (4-1) to (4-6). The $\theta_{X0}$, $\theta_{Y0}$ and $\theta_{Z0}$, of the respective conditional expressions represent the orientation of the probe 21 altered by the rotation mechanism 213. Incidentally, the details of the classification by the respective conditional expressions (4-1) to (4-6) and the calculation of the orientation of the probe 21 will be described below.

$$0 \leq \theta_{X0} < \pi \quad (4\text{-}1)$$

$$\left\{\begin{array}{l} M\theta_{XY2} = M\theta_{XY2P} \\ M\theta_{XY1} = M\theta_{XY1P} \\ M\theta_{XY0} = M\theta_{XY0P} \\ M\theta_{YX2} = M\theta_{YX2P} \\ M\theta_{YX1} = M\theta_{YX1P} \\ M\theta_{YX0} = M\theta_{YX0P} \end{array}\right.$$

$$-\pi < \theta_{X0} < 0 \quad (4\text{-}2)$$

$$\left\{\begin{array}{l} M\theta_{XY2} = M\theta_{XY2M} \\ M\theta_{XY1} = M\theta_{XY1M} \\ M\theta_{XY0} = M\theta_{XY0M} \\ M\theta_{YX2} = M\theta_{YX2M} \\ M\theta_{YX1} = M\theta_{YX1M} \\ M\theta_{YX0} = M\theta_{YX0M} \end{array}\right.$$

$$0 \leq \theta_{Y0} < \pi \quad (4\text{-}3)$$

$$\left\{\begin{array}{l} M\theta_{YZ2} = M\theta_{YZ2P} \\ M\theta_{YZ1} = M\theta_{YZ1P} \\ M\theta_{YZ0} = M\theta_{YZ0P} \\ M\theta_{ZY2} = M\theta_{ZY2P} \\ M\theta_{ZY1} = M\theta_{ZY1P} \\ M\theta_{ZY0} = M\theta_{ZY0P} \end{array}\right.$$

$$-\pi < \theta_{Y0} < 0 \quad (4\text{-}4)$$

$$\left\{\begin{array}{l} M\theta_{YZ2} = M\theta_{YZ2M} \\ M\theta_{YZ1} = M\theta_{YZ1M} \\ M\theta_{YZ0} = M\theta_{YZ0M} \\ M\theta_{ZY2} = M\theta_{ZY2M} \\ M\theta_{ZY1} = M\theta_{ZY1M} \\ M\theta_{ZY0} = M\theta_{ZY0M} \end{array}\right.$$

$$\begin{pmatrix} CT_X \\ CT_Y \\ CT_Z \\ C\theta_X \\ C\theta_Y \\ C\theta_Z \end{pmatrix} = \begin{pmatrix} MI_{X2} & MI_{X1} & 0 & 0 & 0 & 0 & MI_{X0} \\ 0 & 0 & MI_{Y2} & MI_{Y1} & 0 & 0 & MI_{Y0} \\ 0 & 0 & 0 & 0 & MI_{Z2} & MI_{Z1} & MI_{Z0} \\ 0 & 0 & M\theta_{XY2} & M\theta_{XY1} & M\theta_{XZ2} & M\theta_{XZ1} & M\theta_{XY0} + M\theta_{XZ0} \\ M\theta_{YX2} & M\theta_{YX1} & 0 & 0 & M\theta_{YZ2} & M\theta_{YZ1} & M\theta_{YX0} + M\theta_{YZ0} \\ M\theta_{ZX2} & M\theta_{ZX1} & M\theta_{ZY2} & M\theta_{ZY1} & 0 & 0 & M\theta_{ZX0} + M\theta_{ZY0} \end{pmatrix} \begin{pmatrix} a_X^2 \\ a_X \\ a_Y^2 \\ a_Y \\ a_Z^2 \\ a_Z \\ 1 \end{pmatrix} \quad (4)$$

-continued $$0 \leq \theta_{Z0} < \pi \quad (4\text{-}5)$$

$$\begin{cases} M\theta_{XZ2} = M\theta_{XZ2P} \\ M\theta_{XZ1} = M\theta_{XZ1P} \\ M\theta_{XZ0} = M\theta_{XZ0P} \\ M\theta_{ZX2} = M\theta_{ZX2P} \\ M\theta_{ZX1} = M\theta_{ZX1P} \\ M\theta_{ZX0} = M\theta_{ZX0P} \end{cases}$$

$$-\pi < \theta_{Z0} < 0 \quad (4\text{-}6)$$

$$\begin{cases} M\theta_{XZ2} = M\theta_{XZ2M} \\ M\theta_{XZ1} = M\theta_{XZ1M} \\ M\theta_{XZ0} = M\theta_{XZ0M} \\ M\theta_{ZX2} = M\theta_{ZX2M} \\ M\theta_{ZX1} = M\theta_{ZX1M} \\ M\theta_{ZX0} = M\theta_{ZX0M} \end{cases}$$

Further, in accordance with the structure of the slide mechanism 24, since a coefficient vector (referred to as coefficient vector $M_A$ hereinafter) multiplied with the acceleration A varies in the formula (4) depending on the measurement position, i.e. the scale value S indicating the displacement of the slide mechanism 24, the coefficient vector is calculated by the following formula (5) that is modeled as a quadratic expression of the scale value S.

$$\begin{pmatrix} MI_{X2} \\ MI_{X1} \\ MI_{X0} \\ MI_{Y2} \\ MI_{Y1} \\ MI_{Y0} \\ MI_{Z2} \\ MI_{Z1} \\ MI_{Z0} \\ M\theta_{XY2P} \\ \vdots \\ M\theta_{XY0M} \\ M\theta_{XZ2P} \\ \vdots \\ M\theta_{XZ0M} \\ M\theta_{YX2P} \\ \vdots \\ M\theta_{YX0M} \\ M\theta_{YZ2P} \\ \vdots \\ M\theta_{YZ0M} \\ M\theta_{ZX2P} \\ \vdots \\ M\theta_{ZX0M} \\ M\theta_{ZY2P} \\ \vdots \\ M\theta_{ZY0M} \end{pmatrix} = \begin{pmatrix} MI_{X2\_26} & MI_{X2\_25} & MI_{X2\_24} & \cdots & MI_{X2\_3} & MI_{X2\_2} & MI_{X2\_1} & MI_{X2\_0} \\ MI_{X1\_26} & MI_{X1\_25} & MI_{X1\_24} & \cdots & MI_{X1\_3} & MI_{X1\_2} & MI_{X1\_1} & MI_{X1\_0} \\ MI_{X0\_26} & MI_{X0\_25} & MI_{X0\_24} & \cdots & MI_{X0\_3} & MI_{X0\_2} & MI_{X0\_1} & MI_{X0\_0} \\ MI_{Y2\_26} & MI_{Y2\_25} & MI_{Y2\_24} & \cdots & MI_{Y2\_3} & MI_{Y2\_2} & MI_{Y2\_1} & MI_{Y2\_0} \\ MI_{Y1\_26} & MI_{Y1\_25} & MI_{Y1\_24} & \cdots & MI_{Y1\_3} & MI_{Y1\_2} & MI_{Y1\_1} & MI_{Y1\_0} \\ MI_{Y0\_26} & MI_{Y0\_25} & MI_{Y0\_24} & \cdots & MI_{Y0\_3} & MI_{Y0\_2} & MI_{Y0\_1} & MI_{Y0\_0} \\ MI_{Z2\_26} & MI_{Z2\_25} & MI_{Z2\_24} & \cdots & MI_{Z2\_3} & MI_{Z2\_2} & MI_{Z2\_1} & MI_{Z2\_0} \\ MI_{Z1\_26} & MI_{Z1\_25} & MI_{Z1\_24} & \cdots & MI_{Z1\_3} & MI_{Z1\_2} & MI_{Z1\_1} & MI_{Z1\_0} \\ MI_{Z0\_26} & MI_{Z0\_25} & MI_{Z0\_24} & \cdots & MI_{Z0\_3} & MI_{Z0\_2} & MI_{Z0\_1} & MI_{Z0\_0} \\ M\theta_{XY2P\_26} & M\theta_{XY2P\_25} & M\theta_{XY2P\_24} & \cdots & M\theta_{XY2P\_3} & M\theta_{XY2P\_2} & M\theta_{XY2P\_1} & M\theta_{XY2P\_0} \\ \vdots & \vdots & \vdots & \cdots & \vdots & \vdots & \vdots & \vdots \\ M\theta_{XY0M\_26} & M\theta_{XY0M\_25} & M\theta_{XY0M\_24} & \cdots & M\theta_{XY0M\_3} & M\theta_{XY0M\_2} & M\theta_{XY0M\_1} & M\theta_{XY0M\_0} \\ M\theta_{XZ2P\_26} & M\theta_{XZ2P\_25} & M\theta_{XZ2P\_24} & \cdots & M\theta_{XZ2P\_3} & M\theta_{XZ2P\_2} & M\theta_{XZ2P\_1} & M\theta_{XZ2P\_0} \\ \vdots & \vdots & \vdots & \cdots & \vdots & \vdots & \vdots & \vdots \\ M\theta_{XZ0M\_26} & M\theta_{XZ0M\_25} & M\theta_{XZ0M\_24} & \cdots & M\theta_{XZ0M\_3} & M\theta_{XZ0M\_2} & M\theta_{XZ0M\_1} & M\theta_{XZ0M\_0} \\ M\theta_{YX2P\_26} & M\theta_{YX2P\_25} & M\theta_{YX2P\_24} & \cdots & M\theta_{YX2P\_3} & M\theta_{YX2P\_2} & M\theta_{YX2P\_1} & M\theta_{YX2P\_0} \\ \vdots & \vdots & \vdots & \cdots & \vdots & \vdots & \vdots & \vdots \\ M\theta_{YX0M\_26} & M\theta_{YX0M\_25} & M\theta_{YX0M\_24} & \cdots & M\theta_{YX0M\_3} & M\theta_{YX0M\_2} & M\theta_{YX0M\_1} & M\theta_{YX0M\_0} \\ M\theta_{YZ2P\_26} & M\theta_{YZ2P\_25} & M\theta_{YZ2P\_24} & \cdots & M\theta_{YZ2P\_3} & M\theta_{YZ2P\_2} & M\theta_{YZ2P\_1} & M\theta_{YZ2P\_0} \\ \vdots & \vdots & \vdots & \cdots & \vdots & \vdots & \vdots & \vdots \\ M\theta_{YZ0M\_26} & M\theta_{YZ0M\_25} & M\theta_{YZ0M\_24} & \cdots & M\theta_{YZ0M\_3} & M\theta_{YZ0M\_2} & M\theta_{YZ0M\_1} & M\theta_{YZ0M\_0} \\ M\theta_{ZX2P\_26} & M\theta_{ZX2P\_25} & M\theta_{ZX2P\_24} & \cdots & M\theta_{ZX2P\_3} & M\theta_{ZX2P\_2} & M\theta_{ZX2P\_1} & M\theta_{ZX2P\_0} \\ \vdots & \vdots & \vdots & \cdots & \vdots & \vdots & \vdots & \vdots \\ M\theta_{ZX0M\_26} & M\theta_{ZX0M\_25} & M\theta_{ZX0M\_24} & \cdots & M\theta_{ZX0M\_3} & M\theta_{ZX0M\_2} & M\theta_{ZX0M\_1} & M\theta_{ZX0M\_0} \\ M\theta_{ZY2P\_26} & M\theta_{ZY2P\_25} & M\theta_{ZY2P\_24} & \cdots & M\theta_{ZY2P\_3} & M\theta_{ZY2P\_2} & M\theta_{ZY2P\_1} & M\theta_{ZY2P\_0} \\ \vdots & \vdots & \vdots & \cdots & \vdots & \vdots & \vdots & \vdots \\ M\theta_{ZY0M\_26} & M\theta_{ZY0M\_25} & M\theta_{ZY0M\_24} & \cdots & M\theta_{ZY0M\_3} & M\theta_{ZY0M\_2} & M\theta_{ZY0M\_1} & M\theta_{ZY0M\_0} \end{pmatrix} \begin{pmatrix} s_X^2 \cdot s_Y^2 \cdot s_Z^2 \\ s_X^2 \cdot s_Y^2 \cdot s_Z \\ s_X^2 \cdot s_Y \cdot s_Z^2 \\ s_X \cdot s_Y^2 \cdot s_Z^2 \\ s_X^2 \cdot s_Y \cdot s_Z \\ s_X \cdot s_Y^2 \cdot s_Z \\ s_X \cdot s_Y \cdot s_Z^2 \\ s_X^2 \cdot s_Y^2 \\ s_Y^2 \cdot s_Z^2 \\ s_Z^2 \cdot s_X^2 \\ s_X^2 \cdot s_Y \\ s_X^2 \cdot s_Z \\ s_Y^2 \cdot s_X \\ s_Y^2 \cdot s_Z \\ s_Z^2 \cdot s_X \\ s_Z^2 \cdot s_Y \\ s_X \cdot s_Y \cdot s_Z \\ s_X^2 \\ s_Y^2 \\ s_Z^2 \\ s_X \cdot s_Y \\ s_Y \cdot s_Z \\ s_Z \cdot s_X \\ s_X \\ s_Y \\ s_Z \\ 1 \end{pmatrix} \quad (5)$$

In the coordinate measuring machine body 2 of this exemplary embodiment, since the two beam supports 241 are slid along the Y-axis direction, the position error of the measurement piece 211A caused depending on the acceleration A of the scanning movement is less likely to be affected by the scale value $s_Y$ in the Y-axis direction. Accordingly, instead of the formula (5), the coefficient vector $M_A$ is calculated using the following formula (5-1) in which the coefficient multiplied with the scale value $s_Y$ is 0. Incidentally, in the formula (5-1), the coefficient vector (referred to as a coefficient vector $M_S$ hereinafter) multiplied with the scale value S is stored in advance in the storage 55. With the use of the formula (5-1) instead of the formula (5), the size of the coefficient vector $M_S$ stored in the storage 55 can be reduced, thus curtailing the used area of the storage 55.

The orientation of the probe 21 in the +Z-axis direction is not set in the above because the probe 21 cannot be oriented in the +Z-axis direction on account of the structure of the coordinate measuring machine body 2 (see FIG. 1). When the orientation of the probe 21 is set in the ±X-axis direction, the error $er_Y$ and $er_Z$ are calculated by conducting the scanning movement in a YZ plane. When the orientation of the probe 21 is set in the ±Y-axis direction, the error $er_X$ and $er_Z$ are calculated by conducting the scanning movement in an XZ plane. When the orientation of the probe 21 is set in the −Z-axis direction, the error $er_X$ and $er_Y$ are calculated by conducting the scanning movement in an XY plane.

Figure 6:
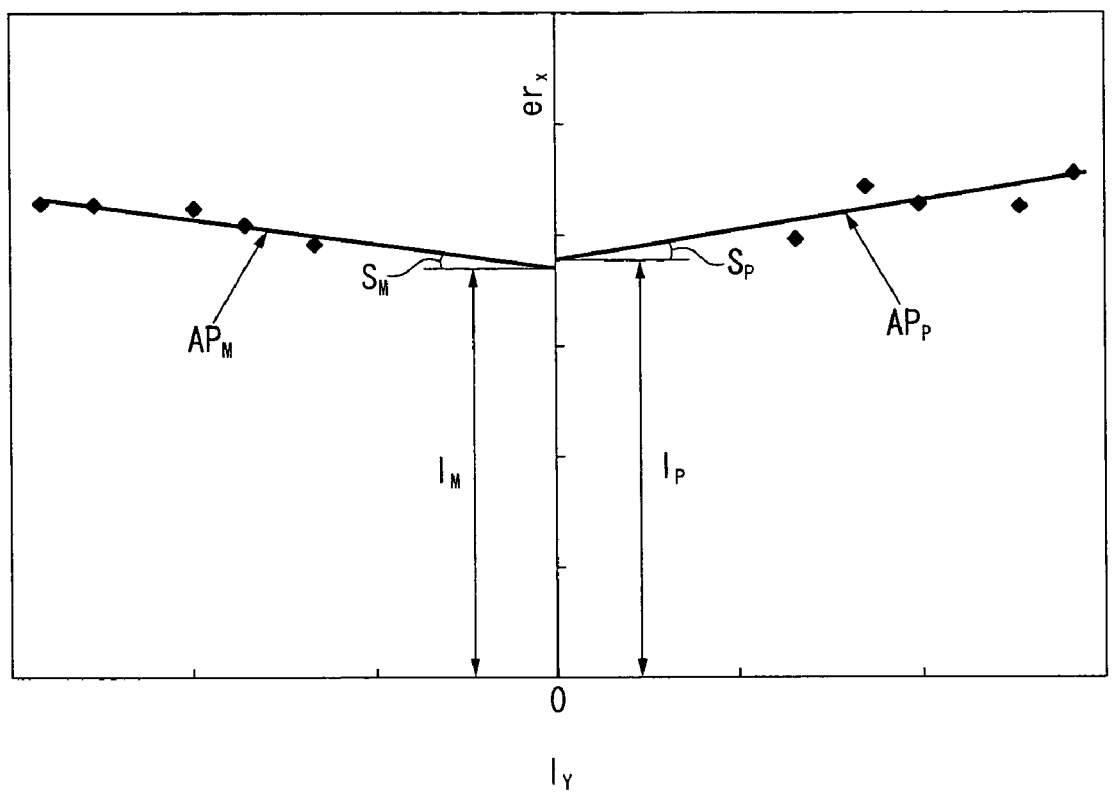
FIG. 6 is a diagram showing a relationship between a swivel length and an X-axis error in the above exemplary embodiment, where an orientation of the probe is set in ±Y-axis direction.

FIG. 6 is a diagram showing a relationship between the swivel length L and the error $er_X$ in the X-axis direction, where an orientation of the probe 21 is taken along ±Y-axis $$\begin{pmatrix} MI_{X2} \\ MI_{X1} \\ MI_{X0} \\ MI_{Y2} \\ MI_{Y1} \\ MI_{Y0} \\ MI_{Z2} \\ MI_{Z1} \\ MI_{Z0} \\ M\theta_{XY2P} \\ \vdots \\ M\theta_{XY0M} \\ M\theta_{XZ2P} \\ \vdots \\ M\theta_{XZ0M} \\ M\theta_{YX2P} \\ \vdots \\ M\theta_{YX0M} \\ M\theta_{YZ2P} \\ \vdots \\ M\theta_{YZ0M} \\ M\theta_{ZX2P} \\ \vdots \\ M\theta_{ZX0M} \\ M\theta_{ZY2P} \\ \vdots \\ M\theta_{ZY0M} \end{pmatrix} = \begin{pmatrix} MI_{X2\_8} & MI_{X2\_7} & MI_{X2\_6} & MI_{X2\_5} & MI_{X2\_4} & MI_{X2\_3} & MI_{X2\_2} & MI_{X2\_1} & MI_{X2\_0} \\ MI_{X1\_8} & MI_{X1\_7} & MI_{X1\_6} & MI_{X1\_5} & MI_{X1\_4} & MI_{X1\_3} & MI_{X1\_2} & MI_{X1\_1} & MI_{X1\_0} \\ MI_{X0\_8} & MI_{X0\_7} & MI_{X0\_6} & MI_{X0\_5} & MI_{X0\_4} & MI_{X0\_3} & MI_{X0\_2} & MI_{X0\_1} & MI_{X0\_0} \\ MI_{Y2\_8} & MI_{Y2\_7} & MI_{Y2\_6} & MI_{Y2\_5} & MI_{Y2\_4} & MI_{Y2\_3} & MI_{Y2\_2} & MI_{Y2\_1} & MI_{Y2\_0} \\ MI_{Y1\_8} & MI_{Y1\_7} & MI_{Y1\_6} & MI_{Y1\_5} & MI_{Y1\_4} & MI_{Y1\_3} & MI_{Y1\_2} & MI_{Y1\_1} & MI_{Y1\_0} \\ MI_{Y0\_8} & MI_{Y0\_7} & MI_{Y0\_6} & MI_{Y0\_5} & MI_{Y0\_4} & MI_{Y0\_3} & MI_{Y0\_2} & MI_{Y0\_1} & MI_{Y0\_0} \\ MI_{Z2\_8} & MI_{Z2\_7} & MI_{Z2\_6} & MI_{Z2\_5} & MI_{Z2\_4} & MI_{Z2\_3} & MI_{Z2\_2} & MI_{Z2\_1} & MI_{Z2\_0} \\ MI_{Z1\_8} & MI_{Z1\_7} & MI_{Z1\_6} & MI_{Z1\_5} & MI_{Z1\_4} & MI_{Z1\_3} & MI_{Z1\_2} & MI_{Z1\_1} & MI_{Z1\_0} \\ MI_{Z0\_8} & MI_{Z0\_7} & MI_{Z0\_6} & MI_{Z0\_5} & MI_{Z0\_4} & MI_{Z0\_3} & MI_{Z0\_2} & MI_{Z0\_1} & MI_{Z0\_0} \\ M\theta_{XY2P\_8} & M\theta_{XY2P\_7} & M\theta_{XY2P\_6} & M\theta_{XY2P\_5} & M\theta_{XY2P\_4} & M\theta_{XY2P\_3} & M\theta_{XY2P\_2} & M\theta_{XY2P\_1} & M\theta_{XY2P\_0} \\ \vdots & \vdots & \vdots & \vdots & \vdots & \vdots & \vdots & \vdots & \vdots \\ M\theta_{XY0M\_8} & M\theta_{XY0M\_7} & M\theta_{XY0M\_6} & M\theta_{XY0M\_5} & M\theta_{XY0M\_4} & M\theta_{XY0M\_3} & M\theta_{XY0M\_2} & M\theta_{XY0M\_1} & M\theta_{XY0M\_0} \\ M\theta_{XZ2P\_8} & M\theta_{XZ2P\_7} & M\theta_{XZ2P\_6} & M\theta_{XZ2P\_5} & M\theta_{XZ2P\_4} & M\theta_{XZ2P\_3} & M\theta_{XZ2P\_2} & M\theta_{XZ2P\_1} & M\theta_{XZ2P\_0} \\ \vdots & \vdots & \vdots & \vdots & \vdots & \vdots & \vdots & \vdots & \vdots \\ M\theta_{XZ0M\_8} & M\theta_{XZ0M\_7} & M\theta_{XZ0M\_6} & M\theta_{XZ0M\_5} & M\theta_{XZ0M\_4} & M\theta_{XZ0M\_3} & M\theta_{XZ0M\_2} & M\theta_{XZ0M\_1} & M\theta_{XZ0M\_0} \\ M\theta_{YX2P\_8} & M\theta_{YX2P\_7} & M\theta_{YX2P\_6} & M\theta_{YX2P\_5} & M\theta_{YX2P\_4} & M\theta_{YX2P\_3} & M\theta_{YX2P\_2} & M\theta_{YX2P\_1} & M\theta_{YX2P\_0} \\ \vdots & \vdots & \vdots & \vdots & \vdots & \vdots & \vdots & \vdots & \vdots \\ M\theta_{YX0M\_8} & M\theta_{YX0M\_7} & M\theta_{YX0M\_6} & M\theta_{YX0M\_5} & M\theta_{YX0M\_4} & M\theta_{YX0M\_3} & M\theta_{YX0M\_2} & M\theta_{YX0M\_1} & M\theta_{YX0M\_0} \\ M\theta_{YZ2P\_8} & M\theta_{YZ2P\_7} & M\theta_{YZ2P\_6} & M\theta_{YZ2P\_5} & M\theta_{YZ2P\_4} & M\theta_{YZ2P\_3} & M\theta_{YZ2P\_2} & M\theta_{YZ2P\_1} & M\theta_{YZ2P\_0} \\ \vdots & \vdots & \vdots & \vdots & \vdots & \vdots & \vdots & \vdots & \vdots \\ M\theta_{YZ0M\_8} & M\theta_{YZ0M\_7} & M\theta_{YZ0M\_6} & M\theta_{YZ0M\_5} & M\theta_{YZ0M\_4} & M\theta_{YZ0M\_3} & M\theta_{YZ0M\_2} & M\theta_{YZ0M\_1} & M\theta_{YZ0M\_0} \\ M\theta_{ZX2P\_8} & M\theta_{ZX2P\_7} & M\theta_{ZX2P\_6} & M\theta_{ZX2P\_5} & M\theta_{ZX2P\_4} & M\theta_{ZX2P\_3} & M\theta_{ZX2P\_2} & M\theta_{ZX2P\_1} & M\theta_{ZX2P\_0} \\ \vdots & \vdots & \vdots & \vdots & \vdots & \vdots & \vdots & \vdots & \vdots \\ M\theta_{ZX0M\_8} & M\theta_{ZX0M\_7} & M\theta_{ZX0M\_6} & M\theta_{ZX0M\_5} & M\theta_{ZX0M\_4} & M\theta_{ZX0M\_3} & M\theta_{ZX0M\_2} & M\theta_{ZX0M\_1} & M\theta_{ZX0M\_0} \\ M\theta_{ZY2P\_8} & M\theta_{ZY2P\_7} & M\theta_{ZY2P\_6} & M\theta_{ZY2P\_5} & M\theta_{ZY2P\_4} & M\theta_{ZY2P\_3} & M\theta_{ZY2P\_2} & M\theta_{ZY2P\_1} & M\theta_{ZY2P\_0} \\ \vdots & \vdots & \vdots & \vdots & \vdots & \vdots & \vdots & \vdots & \vdots \\ M\theta_{ZY0M\_8} & M\theta_{ZY0M\_7} & M\theta_{ZY0M\_6} & M\theta_{ZY0M\_5} & M\theta_{ZY0M\_4} & M\theta_{ZY0M\_3} & M\theta_{ZY0M\_2} & M\theta_{ZY0M\_1} & M\theta_{ZY0M\_0} \end{pmatrix} \begin{pmatrix} s_X^2 \cdot s_Z^2 \\ s_X^2 \cdot s_Z \\ s_X \cdot s_Z^2 \\ s_X^2 \\ s_X \cdot s_Z \\ s_Z^2 \\ s_X \\ s_Z \\ 1 \end{pmatrix} \quad (5\text{-}1)$$

Next, the calculation of the coefficient vector $M_S$ in the formula (5-1) will be described below.

The coefficient vector MS is calculated based on an error $ER(er_X, er_Y, er_Z)$ in the respective X, Y and Z-axis directions. The error ER is calculated by measuring the position of the measurement piece 211A when the probe 21 is subjected to a scanning movement at a constant angular velocity while the measurement piece 211A is in contact with the reference ball 231 and subtracting a radius of the reference ball 231 from a radius of a circle obtained by the measurement positions of the measurement piece 211A.

In this exemplary embodiment, the error ER is calculated while changing the orientation of the probe 21 (the ±X-axis direction, ±Y-axis direction and −Z-axis direction), the measurement position ($s_X$, $s_Y$, $s_Z$), the length from the reference point R to the measurement piece 211A (referred to as a swivel length L) and the velocity of the scanning movement.

direction. Incidentally, in FIG. 6, the horizontal axis is the swivel length $l_Y$ (the swivel lengths in the respective X, Y and Z-axis directions respectively being $l_X$, $l_Y$ and $l_Z$) and the vertical axis is the error $er_X$. Further, FIG. 6 shows the relationship at a constant measurement position and a constant scanning movement velocity.

As shown in FIG. 6, the error $er_X$ increases in accordance with the increase in the absolute value of the swivel length $l_Y$. This is because the error caused according to the rotation angle $C\theta_Z$ depending on the acceleration A of the scanning movement increases. Accordingly, when an intercept and an inclination are calculated by subjecting the respective values of the measured error $er_X$ to a straight-line approximation, it can be considered that the intercept represents the translation error caused depending on the acceleration A of the scanning movement and the inclination represents the error caused depending on the acceleration A of the scanning movement in accordance with the rotation angle C$\theta_Z$.

Thus, an inclination $S_P$ of an approximate curve $AP_P$ when the probe 21 is oriented in the +Y-axis direction, an inclination $S_M$ of an approximate curve $AP_M$ when the probe 21 is oriented in the −Y-axis direction and an intercept I of average of intercepts $I_P$ and $I_M$ of the approximate curves $AP_P$ and $AP_M$ are respectively calculated. Then, the inclinations $S_P$ and $S_M$ of the approximate curves $AP_P$ and $AP_M$ are converted into the angles $\theta_P$ and $\theta_M$ according to the following formula (6).

$$\theta_P = \tan^{-1}(S_P)$$
$$\theta_M = \tan^{-1}(S_M) \quad (6)$$

Figure 7:
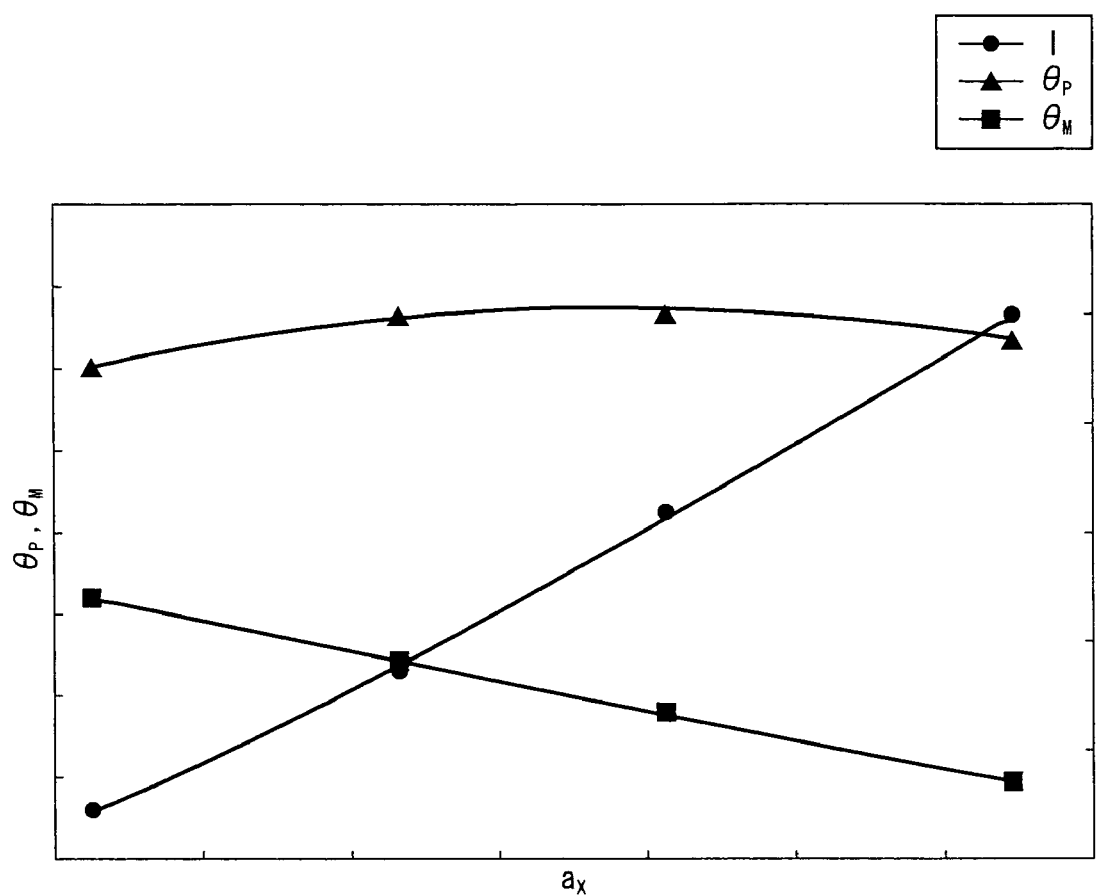
FIG. 7 is an illustration showing a relationship among the acceleration of the scanning movement, an intercept of respective approximate curves and angles.

FIG. 7 is an illustration showing a relationship among the acceleration $a_X$ of the scanning movement, the intercept I of the respective approximate curves $AP_P$ and $AP_M$ and the angles $\theta_P$ and $\theta_M$. Specifically, FIG. 7 shows the intercept I and the angles $\theta_P$ and $\theta_M$ when the error $er_X$ is measured at a constant measurement position while varying the velocity of the scanning movement. In FIG. 7, circular dots represent the intercept I, triangles represent the angle $\theta_P$ and rectangular dots represent the angle $\theta_M$.

As shown in FIG. 7, the intercept I and the angles $\theta_P$ and $\theta_M$ vary in accordance with the increase in the acceleration $a_X$ of the scanning movement. This is because the deformation of the slide mechanism 24 increases in accordance with the increase in the acceleration $a_X$ of the scanning movement.

Accordingly, the intercept I and the angles $\theta_P$ and $\theta_M$ can be represented by the following formula (7) that is modeled as a quadratic expression of the acceleration $a_X$.

$$\begin{pmatrix} I \\ \theta_P \\ \theta_M \end{pmatrix} = \begin{pmatrix} MI_{X2} & MI_{X1} & MI_{X0} \\ M\theta_{ZX2P} & M\theta_{ZX1P} & M\theta_{ZX0P} \\ M\theta_{ZX2M} & M\theta_{ZX1M} & M\theta_{ZX0M} \end{pmatrix} \begin{pmatrix} a_X^2 \\ a_X \\ 1 \end{pmatrix} \quad (7)$$

Incidentally, the suffix (ZX) of $M\theta$ indicates that the coefficient vector is of the error in the X-axis direction based on the rotation angle $\theta_Z$.

Further, on account of the structure of the slide mechanism 24, since the coefficient vector multiplied with the acceleration $a_X$ varies in the formula (7) depending on the scale value $S(s_X, s_Z)$ as described above, the coefficient vector is represented by the following formula (8) that is modeled as a quadratic expression of the scale value S.

Here, since the intercept I, the angles $\theta_P$ and $\theta_M$, the acceleration $a_X$ of the scanning movement and the scale value S are known in the formulae (7) and (8), a coefficient vector (referred to as $MI_X$ and $M\theta_{ZX}$ hereinafter) to be multiplied with the scale value S based on the error $er_X$ when the probe 21 is oriented in the ±Y-axis direction can be calculated from the formulae (7) and (8).

Incidentally, since the coefficient vector $MI_X$ is also calculated on the error $er_X$ where the probe 21 is oriented in the −Z-axis direction, an average value of the respective coefficient vectors $MI_X$ is used in this exemplary embodiment.

Further, in the same manner as the calculation of the coefficient vectors $MI_X$ and $M\theta_{ZX}$, coefficients vectors $MI_Y$, $MI_Z$, $M\theta_{XY}$, $M\theta_{XZ}$, $M\theta_{YX}$, $M\theta_{YZ}$, $M\theta_{ZY}$ are calculated to calculate the coefficient vector $M_S$ shown in the formula (5-1).

Then, as shown in the formula (5-1), the acceleration correction-amount calculating unit 81 calculates the coefficient vector $M_A$ based on the calculated coefficient vector $M_S$ and the scale value S acquired by the displacement acquiring unit 52. Further, as shown in the formula (4), the acceleration correction-amount calculating unit 81 calculates the translation-correction amount CT and the rotation angle C$\theta$ based on the calculated coefficient vector $M_A$ and the acceleration A calculated by the second-order differentiating unit 713.

Here, as described above, the formula (4) is classified into the conditional expressions (4-1) to (4-6). This is because inclinations $S_P$ and $S_M$ of different approximate linear lines are derived according to a difference in the orientation of the probe 21 (i.e. when the probe 21 is oriented in the +Y-axis direction (+X-axis direction) and when the probe 21 is oriented in the −Y-axis direction (−X-axis direction)). Further, as discussed above, since the probe 21 cannot be oriented in the +Z-axis direction on account of the structure of the coordinate measuring machine body 2, the coefficient vector $M_A$ corresponding to the value on the right side of the conditional expression (4-1) cannot be calculated. However, the rotation mechanism 213 can, though slightly, alter the orientation of the probe 21 even within the range of the conditional expression (4-1). Accordingly, the acceleration correction-amount calculating unit 81 calculates the translation-correction amount CT and the rotation angle C$\theta$ using the conditional expression (4-2) even within the range of the conditional expression (4-1).

Incidentally, the acceleration correction-amount calculating unit 81 calculates the orientation ($\theta_{X0}$, $\theta_{Y0}$, $\theta_{Z0}$) of the probe 21 in the conditional expressions (4-1) to (4-6) according to the following formula (9).

$$\begin{pmatrix} MI_{X2} \\ MI_{X1} \\ MI_{X0} \\ M\theta_{ZX2P} \\ M\theta_{ZX1P} \\ M\theta_{ZX0P} \\ M\theta_{ZX2M} \\ M\theta_{ZX1M} \\ M\theta_{ZX0M} \end{pmatrix} = \begin{pmatrix} MI_{X2\_8} & MI_{X2\_7} & MI_{X2\_6} & MI_{X2\_5} & MI_{X2\_4} & MI_{X2\_3} & MI_{X2\_2} & MI_{X2\_1} & MI_{X2\_0} \\ MI_{X1\_8} & MI_{X1\_7} & MI_{X1\_6} & MI_{X1\_5} & MI_{X1\_4} & MI_{X1\_3} & MI_{X1\_2} & MI_{X1\_1} & MI_{X1\_0} \\ MI_{X0\_8} & MI_{X0\_7} & MI_{X0\_6} & MI_{X0\_5} & MI_{X0\_4} & MI_{X0\_3} & MI_{X0\_2} & MI_{X0\_1} & MI_{X0\_0} \\ M\theta_{ZX2P\_8} & M\theta_{ZX2P\_7} & M\theta_{ZX2P\_6} & M\theta_{ZX2P\_5} & M\theta_{ZX2P\_4} & M\theta_{ZX2P\_3} & M\theta_{ZX2P\_2} & M\theta_{ZX2P\_1} & M\theta_{ZX2P\_0} \\ M\theta_{ZX1P\_8} & M\theta_{ZX1P\_7} & M\theta_{ZX1P\_6} & M\theta_{ZX1P\_5} & M\theta_{ZX1P\_4} & M\theta_{ZX1P\_3} & M\theta_{ZX1P\_2} & M\theta_{ZX1P\_1} & M\theta_{ZX1P\_0} \\ M\theta_{ZX0P\_8} & M\theta_{ZX0P\_7} & M\theta_{ZX0P\_6} & M\theta_{ZX0P\_5} & M\theta_{ZX0P\_4} & M\theta_{ZX0P\_3} & M\theta_{ZX0P\_2} & M\theta_{ZX0P\_1} & M\theta_{ZX0P\_0} \\ M\theta_{ZX2M\_8} & M\theta_{ZX2M\_7} & M\theta_{ZX2M\_6} & M\theta_{ZX2M\_5} & M\theta_{ZX2M\_4} & M\theta_{ZX2M\_3} & M\theta_{ZX2M\_2} & M\theta_{ZX2M\_1} & M\theta_{ZX2M\_0} \\ M\theta_{ZX1M\_8} & M\theta_{ZX1M\_7} & M\theta_{ZX1M\_6} & M\theta_{ZX1M\_5} & M\theta_{ZX1M\_4} & M\theta_{ZX1M\_3} & M\theta_{ZX1M\_2} & M\theta_{ZX1M\_1} & M\theta_{ZX1M\_0} \\ M\theta_{ZX0M\_8} & M\theta_{ZX0M\_7} & M\theta_{ZX0M\_6} & M\theta_{ZX0M\_5} & M\theta_{ZX0M\_4} & M\theta_{ZX0M\_3} & M\theta_{ZX0M\_2} & M\theta_{ZX0M\_1} & M\theta_{ZX0M\_0} \end{pmatrix} \begin{pmatrix} s_X^2 \cdot s_Z^2 \\ s_X^2 \cdot s_Z \\ s_X \cdot s_Z^2 \\ s_X^2 \\ s_X \cdot s_Z \\ s_Z^2 \\ s_X \\ s_Z \\ 1 \end{pmatrix} \quad (8)$$

$$\begin{cases} \theta_{X0} = \sin^{-1}\{(b_Y + p_{Y0})/1_{XY}\} \\ \theta_{Y0} = \sin^{-1}\{(b_Z + p_{Z0})/1_{YZ}\} \\ \theta_{Z0} = \sin^{-1}\{(b_X + p_{X0})/1_{XZ}\} \end{cases} \quad (9)$$

Here, the probe vector $P_0(p_{X0}, p_{Y0}, p_{Z0})$ is a vector obtained by calibrating the coordinate measuring machine body 2. Specifically, the probe vector $P_0$ is a vector indicating a displacement from a predetermined position on the coordinate measuring machine body 2 (defined as an origin hereinafter) to the measurement piece 211A. A vector $B(b_X, b_Y, b_Z)$ is a vector representing a displacement from the reference point R to the origin of the probe vector $P_0$. Further, $1_{XY}, 1_{YZ}, 1_{XZ}$ are lengths of orthographs of the swivel length L onto the XY plane, YZ plane and XZ plane, which is calculated according to the following formula (10). Incidentally, the vector B and the swivel length L are stored in advance in the storage 55 per each of the types of the probe, where the vector B and the swivel length L corresponding to the used probe can be selected by the input unit 61.

$$\begin{cases} 1_{XY} = \sqrt{(b_X + p_{X0})^2 + (b_Y + p_{Y0})^2} \\ 1_{YZ} = \sqrt{(b_Y + p_{Y0})^2 + (b_Z + p_{Z0})^2} \\ 1_{XZ} = \sqrt{(b_X + p_{X0})^2 + (b_Z + p_{Z0})^2} \end{cases} \quad (10)$$

The rotation correction-amount calculating unit 82 calculates a rotation-correction amount CR for correcting the rotation error of the probe on account of the rotation angle of the probe 21 and the length of the probe 21 from the reference point R to the measurement piece 211A. Specifically, the rotation correction-amount calculating unit 82 calculates the rotation-correction amount CR based on the rotation angle $C\theta$ calculated by the acceleration correction-amount calculating unit 81, the orientation ($\theta_{X0}, \theta_{Y0}, \theta_{Z0}$) of the probe 21 altered by the rotation mechanism 213 and the length ($1_{XY}, 1_{YZ}, 1_{XZ}$) of the orthograph of the swivel length L onto the XY plane, YZ plane and XZ plane according to the following formula (11).

$$\begin{cases} CR_X = 1_{XY}\{\cos(\theta_{Z0}) - \cos(\theta_{Z0} + C\theta_Z)\} + \\ \qquad 1_{XZ}\{\sin(\theta_{Y0} + C\theta_Y) - \sin(\theta_{Y0})\} \\ CR_Y = 1_{YZ}\{\cos(\theta_{X0}) - \cos(\theta_{X0} + C\theta_X)\} + \\ \qquad 1_{XY}\{\sin(\theta_{Z0} + C\theta_Z) - \sin(\theta_{Z0})\} \\ CR_Z = 1_{XZ}\{\cos(\theta_{Y0}) - \cos(\theta_{Y0} + C\theta_Y)\} + \\ \qquad 1_{YZ}\{\sin(\theta_{X0} + C\theta_X) - \sin(\theta_{X0})\} \end{cases} \quad (11)$$

Figure 8:
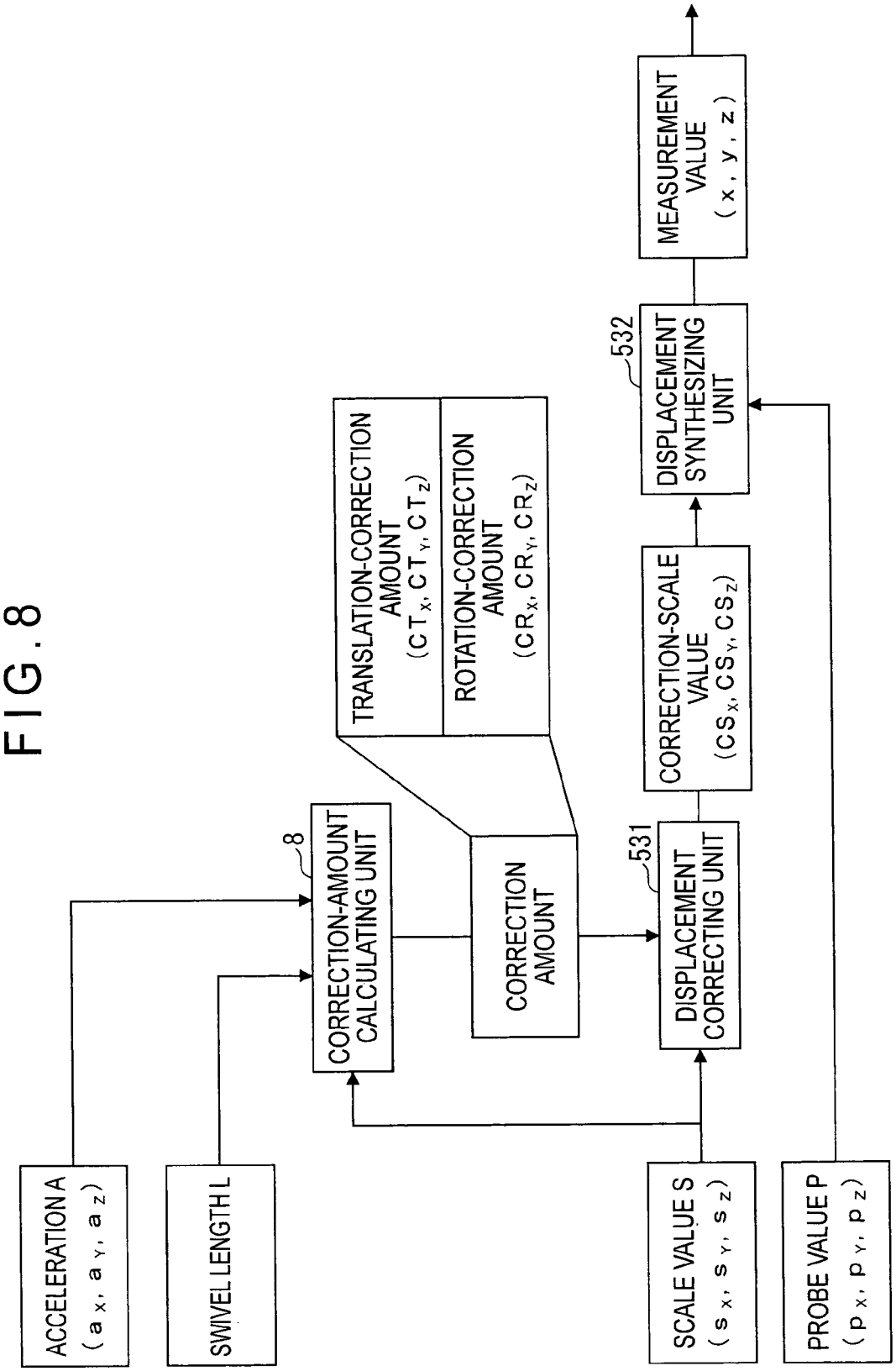
FIG. 8 is an illustration showing a relationship among a correction-amount calculating unit, displacement correcting unit and displacement synthesizing unit in the above exemplary embodiment.

FIG. 8 is an illustration showing a relationship among the correction-amount calculating unit 8, the displacement correcting unit 531 and the displacement synthesizing unit 532.

As described above, the correction-amount calculating unit 8 calculates the correction amount (the translation-correction amount CT and the rotation-correction amount CR) based on the acceleration A, the swivel length L and the scale value S (see FIG. 8).

As shown in FIG. 8, the displacement correcting unit 531 corrects the scale value S acquired by the displacement acquiring unit 52 based on the correction amount calculated by the correction-amount calculating unit 8. Specifically, the displacement correcting unit 531 corrects the scale value S according to the following formula (12) based on the translation-correction amount CT calculated by the acceleration correction-amount calculating unit 81 and the rotation-correction amount CR calculated by the rotation correction-amount calculating unit 82.

$$\begin{cases} CS_X = s_X + CT_X + CR_X \\ CS_Y = s_Y + CT_Y + CR_Y \\ CS_Z = s_Z + CT_Z + CR_Z \end{cases} \quad (12)$$

Then, the displacement synthesizing unit 532 synthesizes a corrected scale value $CS(CS_X, CS_Y, CS_Z)$ corrected by the displacement correcting unit 531 and the probe value P acquired by the displacement acquiring unit 52 according to the following formula (13) to calculate the measurement value (x, y, z).

In other words, a correcting unit is provided by the displacement correcting unit 531 and the displacement synthesizing unit 532 so that the position error of the measurement piece 211A is corrected based on the scale value S acquired by the displacement acquiring unit 52 and the correction amount (the translation-correction amount CT and the rotation-correction amount CR) calculated by the correction-amount calculating unit 8.

$$\begin{cases} x = CS_X + p_X \\ y = CS_Y + p_Y \\ z = CS_Z + p_Z \end{cases} \quad (13)$$

Figure 9A:
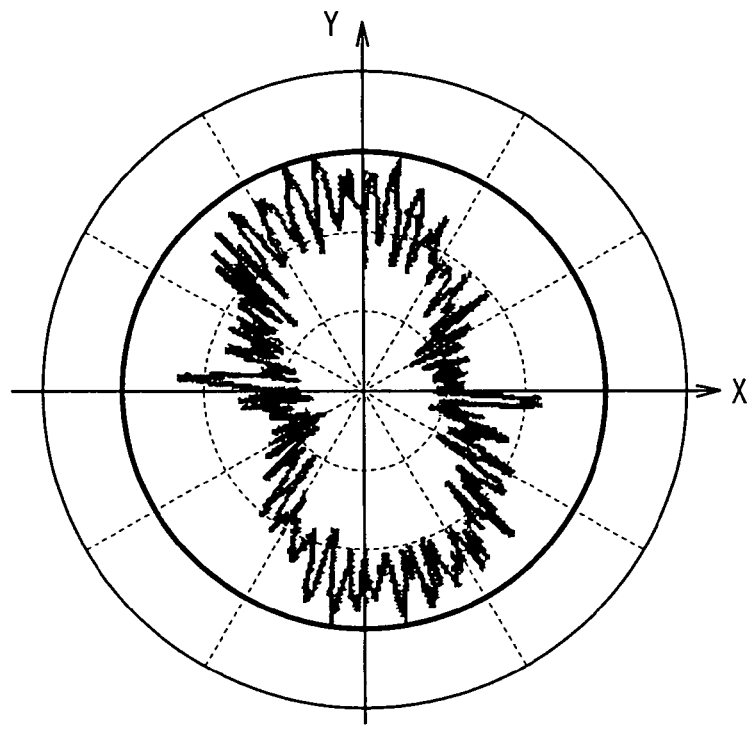
FIG. 9A is an illustration showing a measurement result when a surface profile of an object is measured without correcting a scale value by the displacement correcting unit in the above exemplary embodiment.
Figure 9B:
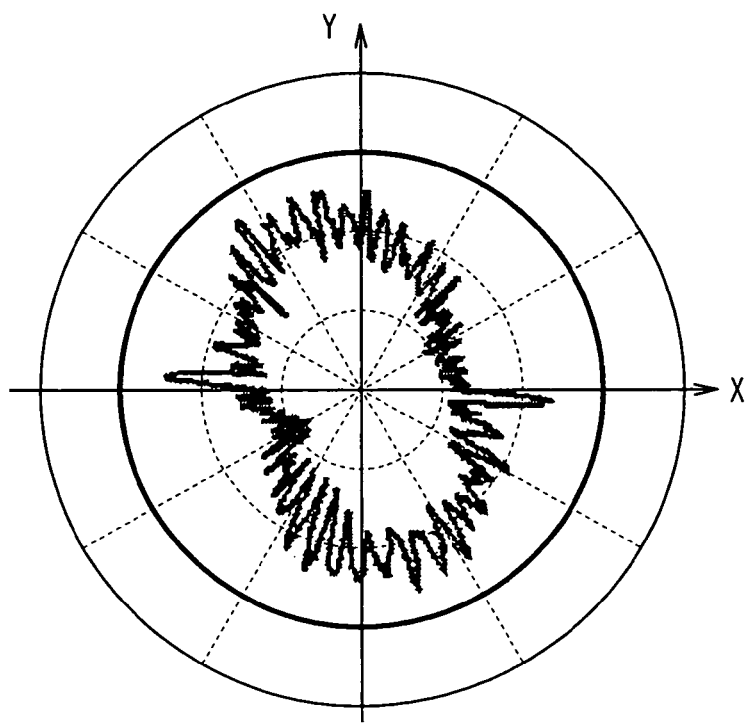
FIG. 9B is an illustration showing a measurement result when the surface profile of the object is measured without correcting the scale value by the displacement correcting unit in the above exemplary embodiment.
Figure 10:
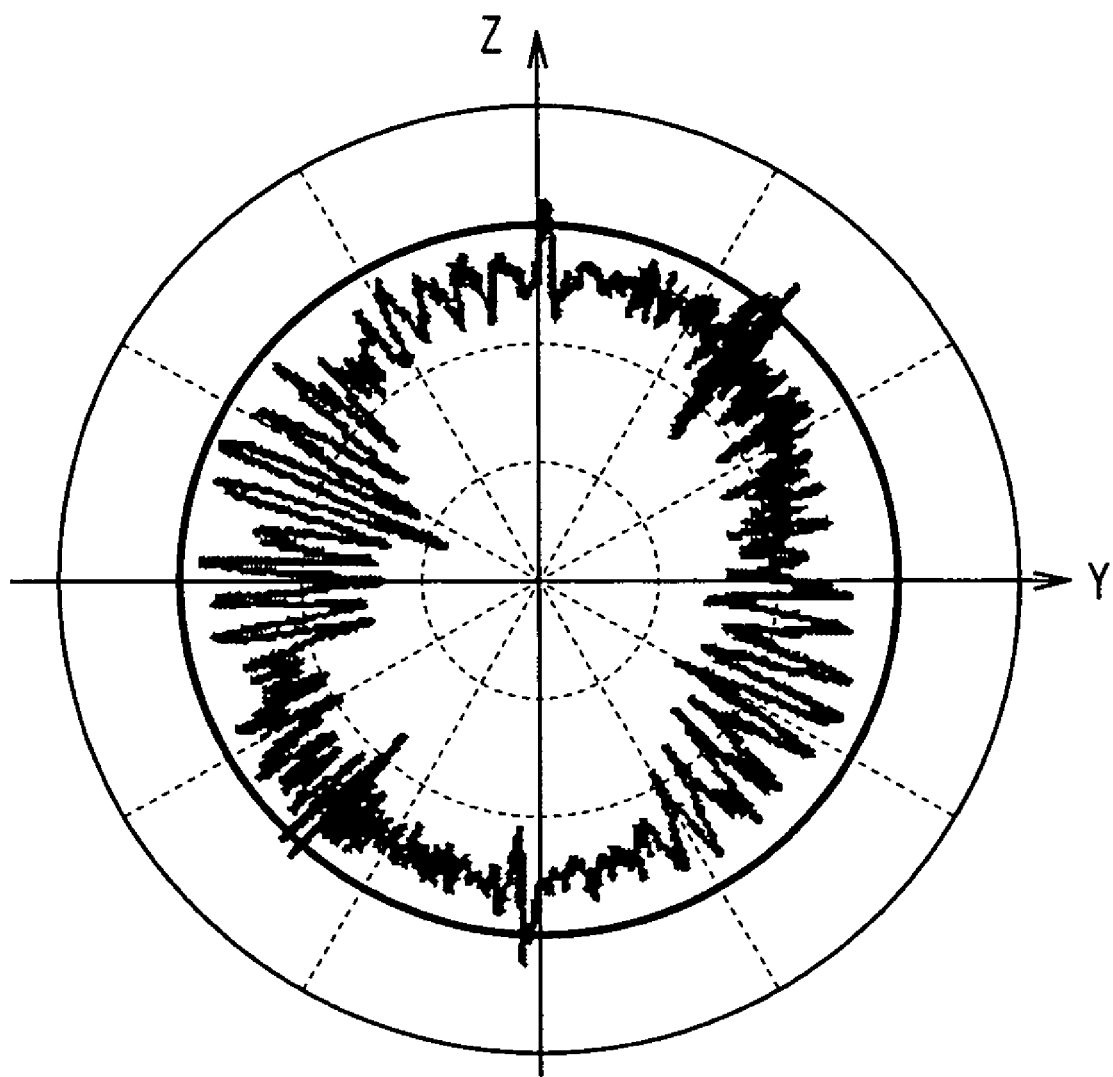
FIG. 10 is an illustration showing a measurement result when the surface profile of the object is measured without correcting the scale value by the displacement correcting unit in the above exemplary embodiment.

FIGS. 9A, 9B and 10 illustrate measurement results when the surface profile of the object W was measured without correcting the scale value S by the displacement correcting unit 531. FIGS. 9A and 9B show the measurement results when the probes 21 of different length were used, where FIG. 9A shows the measurement results when the probe 21 of a long swivel length L was used and FIG. 9B shows the measurement results when the probe 21 of a short swivel length L was used. Further, FIG. 10 shows a measurement result when the attitude of the probe 21 was altered.

In FIGS. 9A, 9B and 10, the circle shown in a heavy line represents a profile data of the object W stored in the storage 55.

As shown in FIGS. 9A, 9B and 10, the respective measurement results are smaller than the profile data in any of the instances. This is because the position error of the measurement piece 211A caused on account of the scanning movement of the probe 21 affected the measurement value.

Further, the measurement results of the case using the probe 21 of a short swivel length L (FIG. 9B) showed a shape smaller than the measurement results (FIG. 9A) using the probe 21 of a long swivel length L. This is because, when probes 21 of different lengths are used, the positions of the measurement piece 211A differ even when the moving mechanism 22 deformed at the same level. Further, the measurement results (FIG. 10) when the attitude of the probe 21 was changed exhibit a shape different from the measurement results (FIGS. 9A and 9B) when the attitude of the probe 21 was not changed. This is because, when the attitude of the probe 21 is altered, the position of the measurement piece 211A relative to the moving mechanism 22 is shifted.

As described above, the above measurement results sampled when the probes 21 of different lengths were used and when the attitude of the probe 21 was altered exhibited different shape. In other words, the errors of measurement value differed in the respective instances.

Accordingly, when the errors in the measurement value are corrected based on the same correction amount irrespective of the difference in the length and the attitude of the probe 21, the errors of the measurement value cannot be appropriately corrected.

Figure 11A:
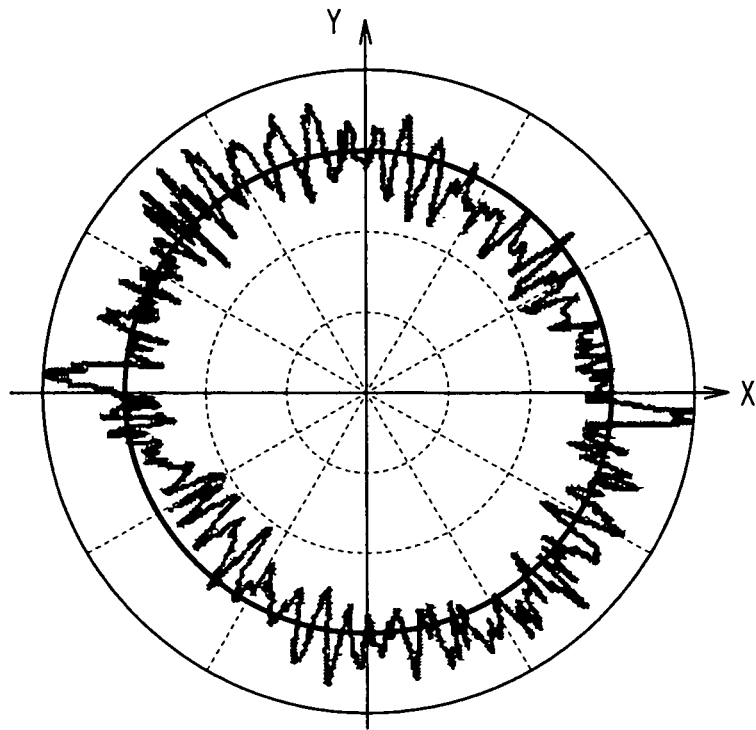
FIG. 11A is an illustration showing a measurement result when the surface profile of the object is measured after correcting the scale value by the displacement correcting unit in the above exemplary embodiment.
Figure 11B:
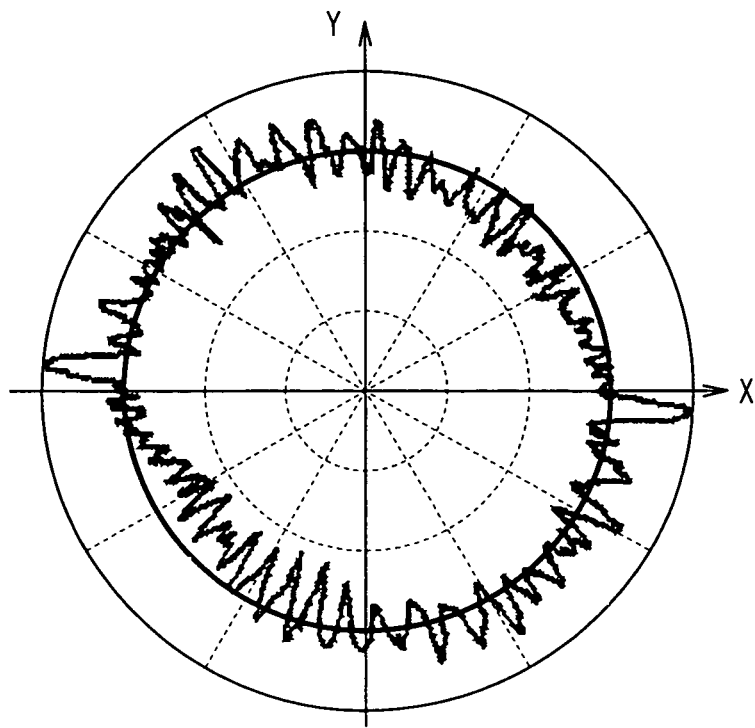
FIG. 11B is an illustration showing a measurement result when the surface profile of the object is measured after correcting the scale value by the displacement correcting unit in the above exemplary embodiment.
Figure 12:
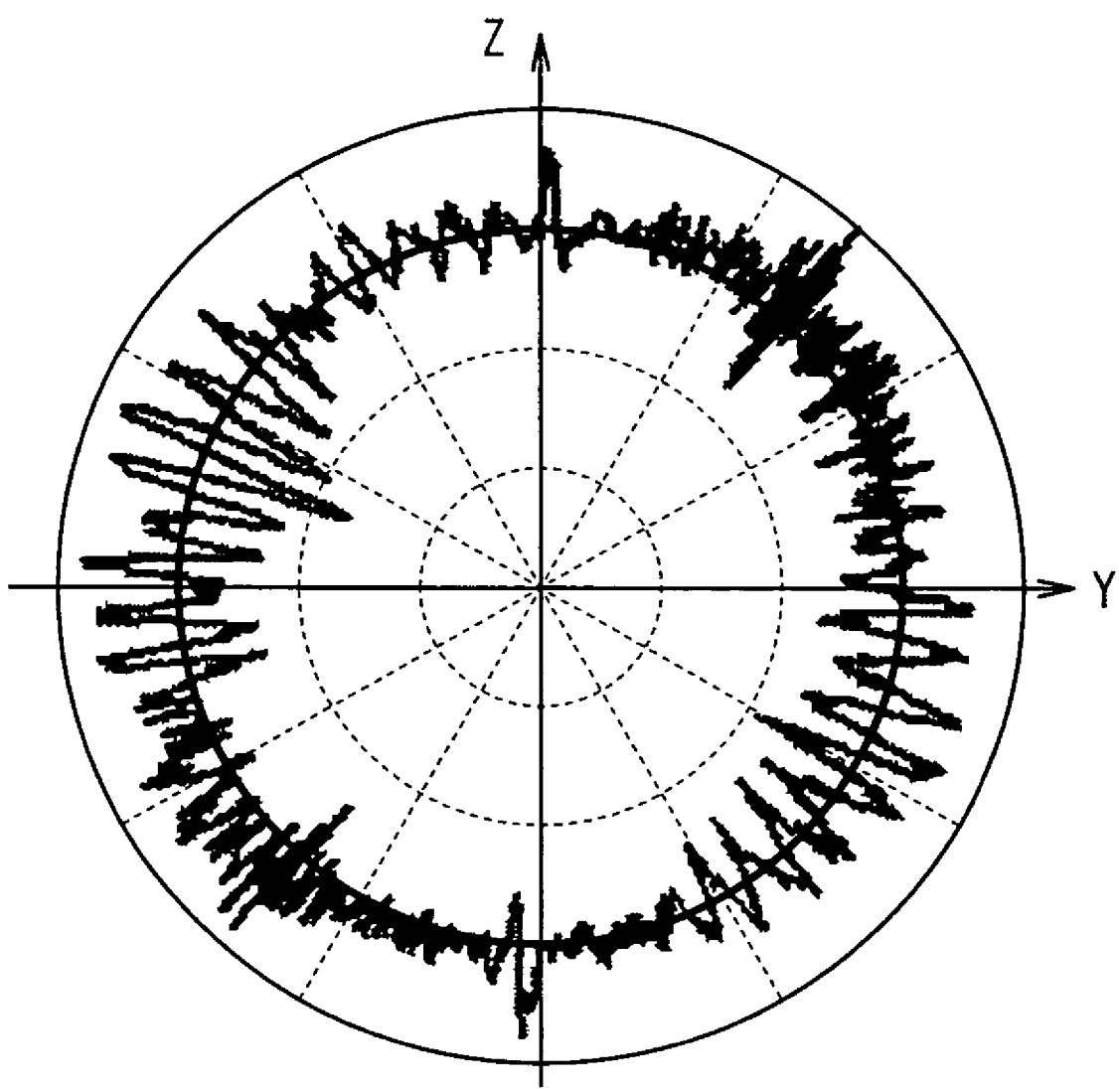
FIG. 12 is an illustration showing a measurement result when the surface profile of the object is measured after correcting the scale value by the displacement correcting unit in the above exemplary embodiment.

FIGS. 11A, 11B and 12 illustrate measurement results when the surface profile of the object W was measured while correcting the scale value S by the displacement correcting unit 531. FIGS. 11A, 1B and 12 respectively correspond to FIGS. 9A, 9B and 10.

As shown in FIGS. 11A, 11B and 12, the respective measurement results exhibited substantially the same shape as the profile data in any of the instances. In other words, the errors in the measurement value could be properly corrected when the probes 21 of different lengths were used and when the attitude of the probe 21 was changed. This is because the position error of the measurement piece 211A was corrected based on the correction amount (the translation-correction amount CT and rotation-correction amount CR) calculated by the correction-amount calculating unit 8.

According to this exemplary embodiment, following advantages can be obtained.

(1) The coordinate measuring machine 1 includes the correction-amount calculating unit 8 for separately calculating the translation-correction amount CT and the rotation-correction amount CR for correcting the position error of the measurement piece 211A caused by the scanning movement of the probe 21, the displacement correcting unit 531 for correcting the position error of the measurement piece 211A based on the translation-correction amount CT and the rotation-correction amount CR calculated by the correction-amount calculating unit 8 and the displacement synthesizing unit 532, the position error of the measurement piece 211A caused on account of the deformation of the slide mechanism 24 can be corrected.

(2) When the length or the attitude of the probe 21 differs, though the translation-correction amount CT calculated by the correction-amount calculating unit 8 is approximately equal, the rotation-correction amount CR becomes different according to the length or the attitude of the probe 21. Accordingly, the correction-amount calculating unit 8 is arranged so that an appropriate correction amount can be calculated even when the length of the probe 21 differs or the attitude of the probe 21 is altered. Consequently, the errors in the measurement value can be properly corrected by the coordinate measuring machine 1 even in such cases.

Second Embodiment

A second exemplary embodiment of the invention will be described below with reference to the attached drawings.

Incidentally, the same reference numeral will be attached to those components having been described and the description thereof will be omitted.

Figure 13:
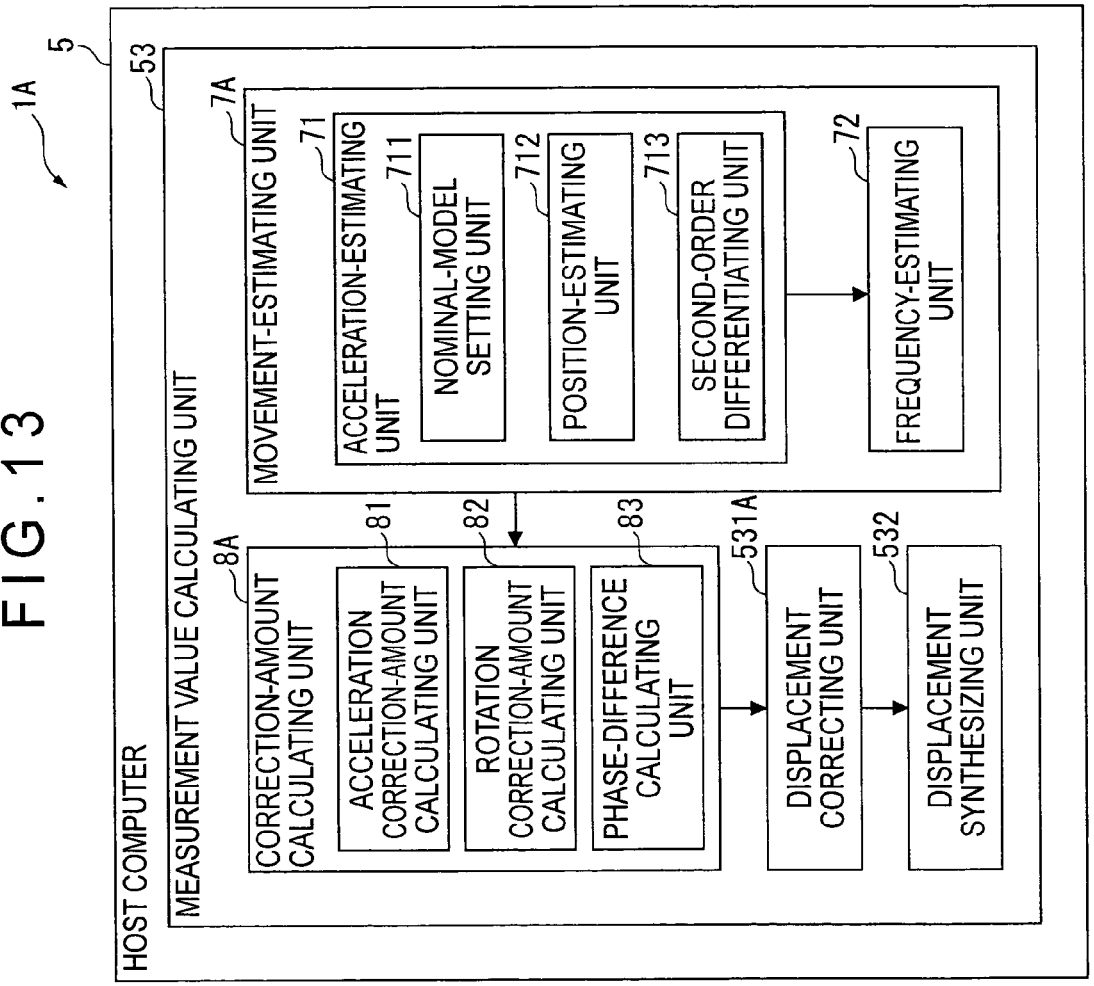
FIG. 13 is a block diagram showing a schematic arrangement of a coordinate measuring machine according to a second exemplary embodiment of the invention.

FIG. 13 is a block diagram showing an overall arrangement of a coordinate measuring machine 1A according to the second exemplary embodiment of the invention.

In the first exemplary embodiment, the movement-estimating unit 7 includes the acceleration-estimating unit 71 to calculate the acceleration A of the scanning movement of the probe 21. In contrast, in this exemplary embodiment, a movement-estimating unit 7A includes, as well as the acceleration-estimating unit 71, a frequency-estimating unit 72 that estimates a frequency of the scanning movement of the probe 21.

Further, in the first exemplary embodiment, the correction-amount calculating unit 8 includes the acceleration correction-amount calculating unit 81 and the rotation correction-amount calculating unit 82 to calculate the translation-correction amount CT and the rotation-correction amount CR as the correction amount. In contrast, a correction-amount calculating unit 8A of this exemplary embodiment includes, as well as the acceleration correction-amount calculating unit 81 and the rotation correction-amount calculating unit 82, a phase difference correction-amount calculating unit 83 that calculates a phase difference correction-amount for correcting a phase difference between the respective movement axes in the X, Y and Z-axis directions of the slide mechanism 24.

The frequency-estimating unit 72 estimates a frequency f when a measurement piece 211A circulates at a constant angular velocity along the side of the object W to depict a circular locus. Specifically, the frequency-estimating unit 72 calculates the frequency f according to the following formula (14) based on the acceleration A of the scanning movement calculated by the second-order differentiating unit 713 and a rotation radius Rs of the measurement piece 211A.

$$f = \sqrt{\frac{\sqrt{a_X^2 + a_Y^2 + a_Z^2}}{(2\pi)^2 \cdot R_S}} \tag{14}$$

Incidentally, the formula (14) can be derived by a deformation shown in the following formulae (15-1) and (15-2) based on the relationship between the frequency f and an angular velocity $\omega$ represented as $\omega = 2\pi f$ and the relationship among a centripetal acceleration $a_N$, rotation radius Rs and the angular velocity $\omega$ represented as $a_N = R_S \omega^2$.

$$\omega = \sqrt{\frac{a_N}{R_S}} = \sqrt{\frac{\sqrt{a_X^2 + a_Y^2 + a_Z^2}}{R_S}} \tag{15-1}$$

$$f = \frac{1}{2\pi} \sqrt{\frac{\sqrt{a_X^2 + a_Y^2 + a_Z^2}}{R_S}} \tag{15-2}$$

$$= \sqrt{\frac{\sqrt{a_X^2 + a_Y^2 + a_Z^2}}{(2\pi)^2 \cdot R_S}}$$

Further, the formula (15-2) can be simplified as the following formula (16), where $f_{XY}$ represents a frequency of the circular motion in the XY plane, $f_{XZ}$ represents a frequency of the circular motion in the XZ plane and $f_{YX}$ represents a frequency of the circular motion in the YZ plane.

$$f_{XY} = \sqrt{\frac{\sqrt{a_X^2 + a_Y^2}}{(2\pi)^2 \cdot R_S}}$$

$$f_{XZ} = \sqrt{\frac{\sqrt{a_X^2 + a_Z^2}}{(2\pi)^2 \cdot R_S}} \tag{16}$$

$$f_{YZ} = \sqrt{\frac{\sqrt{a_Y^2 + a_Z^2}}{(2\pi)^2 \cdot R_S}}$$

The phase difference correction-amount calculating unit 83 calculates the phase difference correction-amount for correcting the phase difference among the respective movement axes of the slide mechanism 24 in the X, Y and Z-axis directions.

As described above, the position control system of the moving mechanism 22 is adjusted so that all of the time constants T of the transfer function in the respective axis directions are equal. Specifically, the moving mechanism 22 is adjusted so that all of the control parameters such as feed-forward gain and the like of the position control system are equal. However, velocity control systems, which are minor loops of position control systems (major loop), respectively exhibit different characteristics since the structure of the respective movement axes of the slide mechanism 24 differ. Accordingly, a phase difference is generated among the respective movement axes of the slide mechanism 24 in accordance with the velocity of the scanning movement, i.e. the frequency f.

Accordingly, the phase difference correction-amount calculating unit 83 calculates a phase-difference correction-amount $C_{\phi XY}$ between the movement axis in the X-axis direction and the movement axis in the Y-axis direction, a phase-difference correction-amount $C_{\phi XZ}$ between the movement axis in the X-axis direction and the movement axis in the Z-axis direction and a phase-difference correction-amount $C_{\phi YZ}$ between the movement axis in the Y-axis direction and the movement axis in the Z-axis direction according to the following formulae (17) and (18) that are modeled as a quadratic expression of the frequency f and a linear expression of the swivel length L.

$$\begin{pmatrix} MI_{XYP} \\ MI_{XYM} \\ MI_{XZP} \\ MI_{XZM} \\ MI_{YZP} \\ MI_{YZM} \\ M\theta_{XYP} \\ M\theta_{XYM} \\ M\theta_{XZP} \\ M\theta_{XZM} \\ M\theta_{YZP} \\ M\theta_{YZM} \end{pmatrix} = \begin{pmatrix} MI_{XY2P} & MI_{XY1P} & 0 & 0 & 0 & 0 & MI_{XY0P} \\ MI_{XY2M} & MI_{XZ1M} & 0 & 0 & 0 & 0 & MI_{XY0M} \\ 0 & 0 & MI_{XZ2P} & MI_{YZ1P} & 0 & 0 & MI_{XZ0P} \\ 0 & 0 & MI_{XZ2M} & MI_{XZ1M} & 0 & 0 & MI_{XZ0M} \\ 0 & 0 & 0 & 0 & MI_{YZ2P} & MI_{YZ1P} & MI_{YZ0P} \\ 0 & 0 & 0 & 0 & MI_{YZ2M} & MI_{YZ1M} & MI_{YZ0M} \\ M\theta_{XY2P} & M\theta_{XY1P} & 0 & 0 & 0 & 0 & M\theta_{XY0P} \\ M\theta_{XY2M} & M\theta_{XY1M} & 0 & 0 & 0 & 0 & M\theta_{XY0M} \\ 0 & 0 & M\theta_{XZ2P} & M\theta_{XZ1P} & 0 & 0 & M\theta_{XZ0P} \\ 0 & 0 & M\theta_{XZ2M} & M\theta_{XZ1M} & 0 & 0 & M\theta_{XZ0M} \\ 0 & 0 & 0 & 0 & M\theta_{YZ2P} & M\theta_{YZ1P} & M\theta_{YZ0P} \\ 0 & 0 & 0 & 0 & M\theta_{YZ2M} & M\theta_{YZ1M} & M\theta_{YZ0M} \end{pmatrix} \begin{pmatrix} f_{XY}^2 \\ f_{XY} \\ f_{XZ}^2 \\ f_{XZ} \\ f_{YZ}^2 \\ f_{YZ} \\ 1 \end{pmatrix} \quad (17)$$

$$\begin{pmatrix} C\phi_{XYP} \\ C\phi_{XYM} \\ C\phi_{XZP} \\ C\phi_{XZM} \\ C\phi_{YZP} \\ C\phi_{YZM} \end{pmatrix} = \begin{pmatrix} 0 & 0 & M\theta_{XYP} & MI_{XYP} \\ 0 & 0 & M\theta_{XYM} & MI_{XYM} \\ 0 & M\theta_{XZP} & 0 & MI_{XZP} \\ 0 & M\theta_{XZM} & 0 & MI_{XZM} \\ M\theta_{YZP} & 0 & 0 & MI_{YZP} \\ M\theta_{YZM} & 0 & 0 & MI_{YZM} \end{pmatrix} \begin{pmatrix} 1_X \\ 1_Y \\ 1_Z \\ 1 \end{pmatrix} \quad (18)$$

However, the formula (18) is classified according to the following conditional expressions (18-1) to (18-3). The details of the classification by the conditional expressions (18-1) to (18-3) will be described below.

$$C\phi_{XZ} \begin{cases} = C\phi_{XZP} (1_X \geq 0) \\ = C\phi_{XZM} (1_X < 0) \end{cases} \quad (18\text{-}1)$$

$$C\phi_{YZ} \begin{cases} = C\phi_{YZP} (1_Y \geq 0) \\ = C\phi_{YZM} (1_Y < 0) \end{cases} \quad (18\text{-}2)$$

$$C\phi_{XY} \begin{cases} = C\phi_{XYP} (1_Z \geq 0) \\ = C\phi_{XYM} (1_Z < 0) \end{cases} \quad (18\text{-}3)$$

Further, on account of the structure of the slide mechanism 24, since the coefficient vector (referred to as $M_f$ hereinafter) multiplied with the frequency f varies in the formula (17) depending on the measurement position, the coefficient vector $M_f$ is represented by the following formulae (19-1) to (19-3) that are modeled as quadratic expressions of the scale value S. Incidentally, in the formulae (19-1) to (19-3), the coefficient multiplied with the scale value $s_Y$ is set at zero to reduce the size of the coefficient vectors (referred to as $M_{XY}$, $M_{XZ}$, $M_{YZ}$ hereinafter) stored in the storage 55 to curtail the used area in the storage 55.

$$\begin{pmatrix} MI_{XY2P} \\ MI_{XY1P} \\ MI_{XY0P} \\ MI_{XY2M} \\ MI_{XY1M} \\ MI_{XY0M} \\ M\theta_{XY2P} \\ M\theta_{XY1P} \\ M\theta_{XY0P} \\ M\theta_{XY2M} \\ M\theta_{XY1M} \\ M\theta_{XY0M} \end{pmatrix} = \begin{pmatrix} MI_{XY2P\_8} & MI_{XY2P\_7} & MI_{XY2P\_6} & MI_{XY2P\_5} & MI_{XY2P\_4} & MI_{XY2P\_3} & MI_{XY2P\_2} & MI_{XY2P\_1} & MI_{XY2P\_0} \\ MI_{XY1P\_8} & MI_{XY1P\_7} & MI_{XY1P\_6} & MI_{XY1P\_5} & MI_{XY1P\_4} & MI_{XY1P\_3} & MI_{XY1P\_2} & MI_{XY1P\_1} & MI_{XY1P\_0} \\ MI_{XY0P\_8} & MI_{XY0P\_7} & MI_{XY0P\_6} & MI_{XY0P\_5} & MI_{XY0P\_4} & MI_{XY0P\_3} & MI_{XY0P\_2} & MI_{XY0P\_1} & MI_{XY0P\_0} \\ MI_{XY2M\_8} & MI_{XY2M\_7} & MI_{XY2M\_6} & MI_{XZ2M\_5} & MI_{XY2M\_4} & MI_{XY2M\_3} & MI_{XY2M\_2} & MI_{XY2M\_1} & MI_{XY2M\_0} \\ MI_{XY1M\_8} & MI_{XY1M\_7} & MI_{XY1M\_6} & MI_{XY1M\_5} & MI_{XY1M\_4} & MI_{XY1M\_3} & MI_{XY1M\_2} & MI_{XY1M\_1} & MI_{XY1M\_0} \\ MI_{XY0M\_8} & MI_{XY0M\_7} & MI_{XY0M\_6} & MI_{XY0M\_5} & MI_{XY0M\_4} & MI_{XY0M\_3} & MI_{XY0M\_2} & MI_{XY0M\_1} & MI_{XY0M\_0} \\ M\theta_{XY2P\_8} & M\theta_{XY2P\_7} & M\theta_{XY2P\_6} & M\theta_{XY2P\_5} & M\theta_{XY2P\_4} & M\theta_{XY2P\_3} & M\theta_{XY2P\_2} & M\theta_{XY2P\_1} & M\theta_{XY2P\_0} \\ M\theta_{XY1P\_8} & M\theta_{XY1P\_7} & M\theta_{XY1P\_6} & M\theta_{XY1P\_5} & M\theta_{XY1P\_4} & M\theta_{XY1P\_3} & M\theta_{XY1P\_2} & M\theta_{XY1P\_1} & M\theta_{XY1P\_0} \\ M\theta_{XY0P\_8} & M\theta_{XY0P\_7} & M\theta_{XY0P\_6} & M\theta_{XY1P\_5} & M\theta_{XY0P\_4} & M\theta_{XY0P\_3} & M\theta_{XY0P\_2} & M\theta_{XY0P\_1} & M\theta_{XY0P\_0} \\ M\theta_{XY2M\_8} & M\theta_{XY2M\_7} & M\theta_{XY2M\_6} & M\theta_{XY2M\_5} & M\theta_{XY2M\_4} & M\theta_{XY2M\_3} & M\theta_{XY2M\_2} & M\theta_{XY2M\_1} & M\theta_{XY2M\_0} \\ M\theta_{XY1M\_8} & M\theta_{XY1M\_7} & M\theta_{XY1M\_6} & M\theta_{XY1M\_5} & M\theta_{XY1M\_4} & M\theta_{XY1M\_3} & M\theta_{XY1M\_2} & M\theta_{XY1M\_1} & M\theta_{XY1M\_0} \\ M\theta_{XY0M\_8} & M\theta_{XY0M\_7} & M\theta_{XY0M\_6} & M\theta_{XY0M\_5} & M\theta_{XY0M\_4} & M\theta_{XY0M\_3} & M\theta_{XY0M\_2} & M\theta_{XY0M\_1} & M\theta_{XY0M\_0} \end{pmatrix} \begin{pmatrix} s_X^2 \cdot s_Z^2 \\ s_X^2 \cdot s_Z \\ s_X \cdot s_Z^2 \\ s_X^2 \\ s_X \cdot s_Z \\ s_Z^2 \\ s_X \\ s_Z \\ 1 \end{pmatrix} \quad (19\text{-}1)$$

$$\begin{pmatrix} MI_{XZ2P} \\ MI_{XZ1P} \\ MI_{XZ0P} \\ MI_{XZ2M} \\ MI_{XZ1M} \\ MI_{XZ0M} \\ M\theta_{XZ2P} \\ M\theta_{XZ1P} \\ M\theta_{XZ0P} \\ M\theta_{XZ2M} \\ M\theta_{XZ1M} \\ M\theta_{XZ0M} \end{pmatrix} = \begin{pmatrix} MI_{XZ2P\_8} & MI_{XZ2P\_7} & MI_{XZ2P\_6} & MI_{XZ2P\_5} & MI_{XZ2P\_4} & MI_{XZ2P\_3} & MI_{XZ2P\_2} & MI_{XZ2P\_1} & MI_{XZ2P\_0} \\ MI_{XZ1P\_8} & MI_{XZ1P\_7} & MI_{XZ1P\_6} & MI_{XZ1P\_5} & MI_{XZ1P\_4} & MI_{XZ1P\_3} & MI_{XZ1P\_2} & MI_{XZ1P\_1} & MI_{XZ1P\_0} \\ MI_{XZ0P\_8} & MI_{XZ0P\_7} & MI_{XZ0P\_6} & MI_{XZ0P\_5} & MI_{XZ0P\_4} & MI_{XZ0P\_3} & MI_{XZ0P\_2} & MI_{XZ0P\_1} & MI_{XZ0P\_0} \\ MI_{XZ2M\_8} & MI_{XZ2M\_7} & MI_{XZ2M\_6} & MI_{XZ2M\_5} & MI_{XZ2M\_4} & MI_{XZ2M\_3} & MI_{XZ2M\_2} & MI_{XZ2M\_1} & MI_{XZ2M\_0} \\ MI_{XZ1M\_8} & MI_{XZ1M\_7} & MI_{XZ1M\_6} & MI_{XZ1M\_5} & MI_{XZ1M\_4} & MI_{XZ1M\_3} & MI_{XZ1M\_2} & MI_{XZ1M\_1} & MI_{XZ1M\_0} \\ MI_{XZ0M\_8} & MI_{XZ0M\_7} & MI_{XZ0M\_6} & MI_{XZ0M\_5} & MI_{XZ0M\_4} & MI_{XZ0M\_3} & MI_{XZ0M\_2} & MI_{XZ0M\_1} & MI_{XZ0M\_0} \\ M\theta_{XZ2P\_8} & M\theta_{XZ2P\_7} & M\theta_{XZ2P\_6} & M\theta_{XZ2P\_5} & M\theta_{XZ2P\_4} & M\theta_{XZ2P\_3} & M\theta_{XZ2P\_2} & M\theta_{XZ2P\_1} & M\theta_{XZ2P\_0} \\ M\theta_{XZ1P\_8} & M\theta_{XZ1P\_7} & M\theta_{XZ1P\_6} & M\theta_{XZ1P\_5} & M\theta_{XZ1P\_4} & M\theta_{XZ1P\_3} & M\theta_{XZ1P\_2} & M\theta_{XZ1P\_1} & M\theta_{XZ1P\_0} \\ M\theta_{XZ0P\_8} & M\theta_{XZ0P\_7} & M\theta_{XZ0P\_6} & M\theta_{XZ0P\_5} & M\theta_{XZ0P\_4} & M\theta_{XZ0P\_3} & M\theta_{XZ0P\_2} & M\theta_{XZ0P\_1} & M\theta_{XZ0P\_0} \\ M\theta_{XZ2M\_8} & M\theta_{XZ2M\_7} & M\theta_{XZ2M\_6} & M\theta_{XZ2M\_5} & M\theta_{XZ2M\_4} & M\theta_{XZ2M\_3} & M\theta_{XZ2M\_2} & M\theta_{XZ2M\_1} & M\theta_{XZ2M\_0} \\ M\theta_{XZ1M\_8} & M\theta_{XZ1M\_7} & M\theta_{XZ1M\_6} & M\theta_{XZ1M\_5} & M\theta_{XZ1M\_4} & M\theta_{XZ1M\_3} & M\theta_{XZ1M\_2} & M\theta_{XZ1M\_1} & M\theta_{XZ1M\_0} \\ M\theta_{XZ0M\_8} & M\theta_{XZ0M\_7} & M\theta_{XZ0M\_6} & M\theta_{XZ0M\_5} & M\theta_{XZ0M\_4} & M\theta_{XZ0M\_3} & M\theta_{XZ0M\_2} & M\theta_{XZ0M\_1} & M\theta_{XZ0M\_0} \end{pmatrix} \begin{pmatrix} s_X^2 \cdot s_Z^2 \\ s_X^2 \cdot s_Z \\ s_X \cdot s_Z^2 \\ s_X^2 \\ s_X \cdot s_Z \\ s_Z^2 \\ s_X \\ s_Z \\ 1 \end{pmatrix} \quad (19\text{-}2)$$

$$\begin{pmatrix} MI_{YZ2P} \\ MI_{YZ1P} \\ MI_{YZ0P} \\ MI_{YZ2M} \\ MI_{YZ1M} \\ MI_{YZ0M} \\ M\theta_{YZ2P} \\ M\theta_{YZ1P} \\ M\theta_{YZ0P} \\ M\theta_{YZ2M} \\ M\theta_{YZ1M} \\ M\theta_{YZ0M} \end{pmatrix} = \begin{pmatrix} MI_{YZ2P\_8} & MI_{YZ2P\_7} & MI_{YZ2P\_6} & MI_{YZ2P\_5} & MI_{YZ2P\_4} & MI_{YZ2P\_3} & MI_{YZ2P\_2} & MI_{YZ2P\_1} & MI_{YZ2P\_0} \\ MI_{YZ1P\_8} & MI_{YZ1P\_7} & MI_{YZ1P\_6} & MI_{YZ1P\_5} & MI_{YZ1P\_4} & MI_{YZ1P\_3} & MI_{YZ1P\_2} & MI_{YZ1P\_1} & MI_{YZ1P\_0} \\ MI_{YZ0P\_8} & MI_{YZ0P\_7} & MI_{YZ0P\_6} & MI_{YZ0P\_5} & MI_{YZ0P\_4} & MI_{YZ0P\_3} & MI_{YZ0P\_2} & MI_{YZ0P\_1} & MI_{YZ0P\_0} \\ MI_{YZ2M\_8} & MI_{YZ2M\_7} & MI_{YZ2M\_6} & MI_{YZ2M\_5} & MI_{YZ2M\_4} & MI_{YZ2M\_3} & MI_{YZ2M\_2} & MI_{YZ2M\_1} & MI_{YZ2M\_0} \\ MI_{YZ1M\_8} & MI_{YZ1M\_7} & MI_{YZ1M\_6} & MI_{YZ1M\_5} & MI_{YZ1M\_4} & MI_{YZ1M\_3} & MI_{YZ1M\_2} & MI_{YZ1M\_1} & MI_{YZ1M\_0} \\ MI_{YZ0M\_8} & MI_{YZ0M\_7} & MI_{YZ0M\_6} & MI_{YZ0M\_5} & MI_{YZ0M\_4} & MI_{YZ0M\_3} & MI_{YZ0M\_2} & MI_{YZ0M\_1} & MI_{YZ0M\_0} \\ M\theta_{YZ2P\_8} & M\theta_{YZ2P\_7} & M\theta_{YZ2P\_6} & M\theta_{YZ2P\_5} & M\theta_{YZ2P\_4} & M\theta_{YZ2P\_3} & M\theta_{YZ2P\_2} & M\theta_{YZ2P\_1} & M\theta_{YZ2P\_0} \\ M\theta_{YZ1P\_8} & M\theta_{YZ1P\_7} & M\theta_{YZ1P\_6} & M\theta_{YZ1P\_5} & M\theta_{YZ1P\_4} & M\theta_{YZ1P\_3} & M\theta_{YZ1P\_2} & M\theta_{YZ1P\_1} & M\theta_{YZ1P\_0} \\ M\theta_{YZ0P\_8} & M\theta_{YZ0P\_7} & M\theta_{YZ0P\_6} & M\theta_{YZ0P\_5} & M\theta_{YZ0P\_4} & M\theta_{YZ0P\_3} & M\theta_{YZ0P\_2} & M\theta_{YZ0P\_1} & M\theta_{YZ0P\_0} \\ M\theta_{YZ2M\_8} & M\theta_{YZ2M\_7} & M\theta_{YZ2M\_6} & M\theta_{YZ2M\_5} & M\theta_{YZ2M\_4} & M\theta_{YZ2M\_3} & M\theta_{YZ2M\_2} & M\theta_{YZ2M\_1} & M\theta_{YZ2M\_0} \\ M\theta_{YZ1M\_8} & M\theta_{YZ1M\_7} & M\theta_{YZ1M\_6} & M\theta_{YZ1M\_5} & M\theta_{YZ1M\_4} & M\theta_{YZ1M\_3} & M\theta_{YZ1M\_2} & M\theta_{YZ1M\_1} & M\theta_{YZ1M\_0} \\ M\theta_{YZ0M\_8} & M\theta_{YZ0M\_7} & M\theta_{YZ0M\_6} & M\theta_{YZ0M\_5} & M\theta_{YZ0M\_4} & M\theta_{YZ0M\_3} & M\theta_{YZ0M\_2} & M\theta_{YZ0M\_1} & M\theta_{YZ0M\_0} \end{pmatrix} \begin{pmatrix} s_X^2 \cdot s_Z^2 \\ s_X^2 \cdot s_Z \\ s_X \cdot s_Z^2 \\ s_X^2 \\ s_X \cdot s_Z \\ s_Z^2 \\ s_X \\ s_Z \\ 1 \end{pmatrix} \quad (19\text{-}3)$$

Next, the calculation of the coefficient vectors $M_{XY}$, $M_{XZ}$, $M_{YZ}$ in the formulae (19-1) to (19-3) will be described below.

The coefficient vectors $M_{XY}$, $M_{XZ}$, $M_{YZ}$ are calculated based on the phase difference $\phi(\phi_{XY}, \phi_{XZ}, \phi_{YZ})$ among the respective movement axes. The phase difference $\phi$ is calculated based on the position of the measurement piece 211A measured when the probe 21 is subjected to a scanning movement at a constant angular velocity while the measurement piece 211A is in contact with the reference ball 231.

Figure 14:
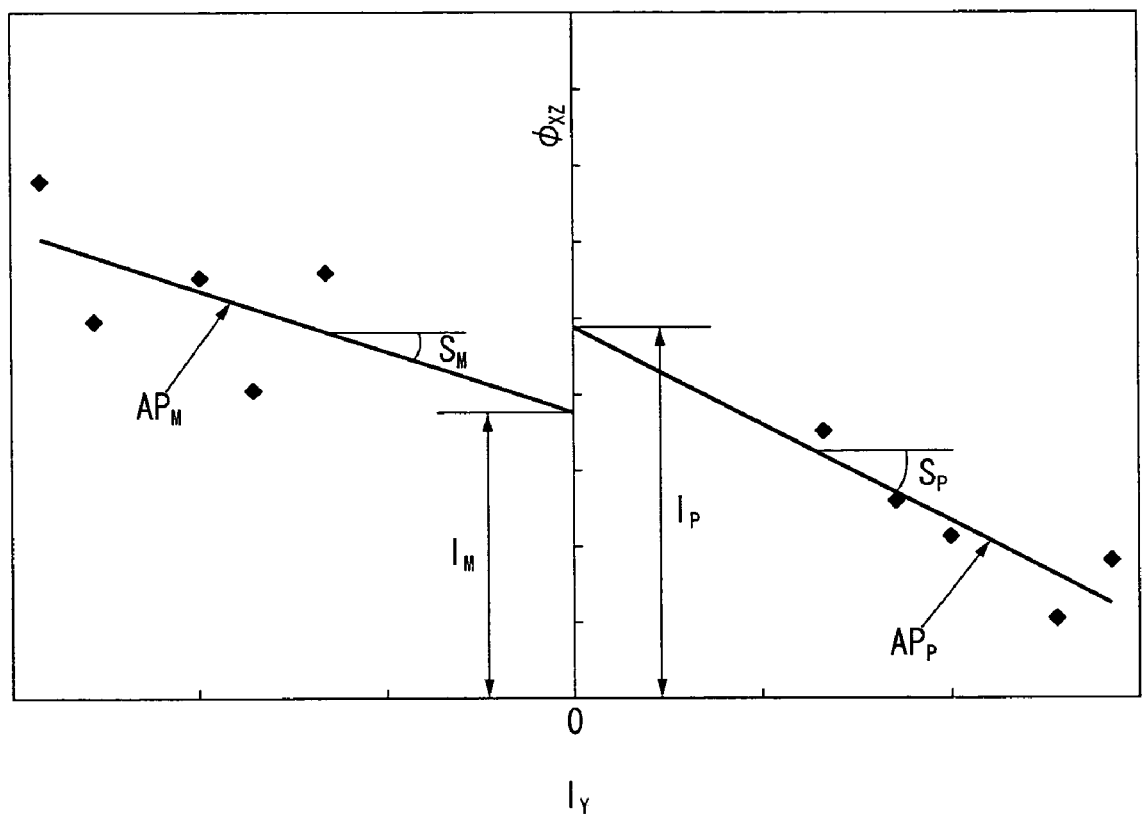
FIG. 14 is a diagram showing a relationship between a swivel length, where an orientation of the probe is set in the ±Y-axis direction, and a phase difference between movement axes in X and Z-axis directions.

FIG. 14 is a diagram showing a relationship between: a swivel length $l_Y$, where the orientation of the probe 21 is set in the ±Y-axis direction; and the phase difference $\phi_{XZ}$ between the movement axes in the X and Z-axis directions. Further, FIG. 14 shows the relationship at a constant measurement position and a constant scanning movement velocity.

As shown in FIG. 14, the phase difference $\phi_{XZ}$ increases in accordance with the increase in the swivel length $l_Y$ in + direction. Incidentally, when the coefficient vectors $M_{XY}$, $M_{XZ}$ and $M_{YZ}$ for calculating the phase-difference correction-amount C$\phi$ are calculated, the respective values of the phase difference $\phi$ measured similarly to the calculation of the coefficient vectors $MI_X$, $MI_Y$, $MI_Z$, $M\theta_{XY}$, $M\theta_{XZ}$, $M\theta_{YX}$, $M\theta_{YZ}$, $M\theta_{ZX}$ and $M\theta_{ZY}$ for calculating the acceleration-correction amount (the translation-correction amount CT and the rotation angle C$\theta$) are subjected to a straight-line approximation. Specifically, the coefficient vector $M_{XZ}$, for instance, is calculated as follows.

Initially, an inclination $S_P$ and an intercept $I_P$ of an approximate curve $AP_P$ when the probe 21 is oriented in the +Y-axis direction, and an inclination $S_M$ and an intercept $I_M$ of an approximate curve $AP_M$ when the probe 21 is oriented in the −Y-axis direction are respectively calculated. Then, the inclinations $S_P$ and $S_M$ of the approximate curves $AP_P$ and $AP_M$ are converted into the angles $\theta_P$ and $\theta_M$ according to the following formula (20).

$$\theta_P = \tan^{-1}(S_P)$$

$$\theta_M = \tan^{-1}(S_M) \tag{20}$$

Figure 15:
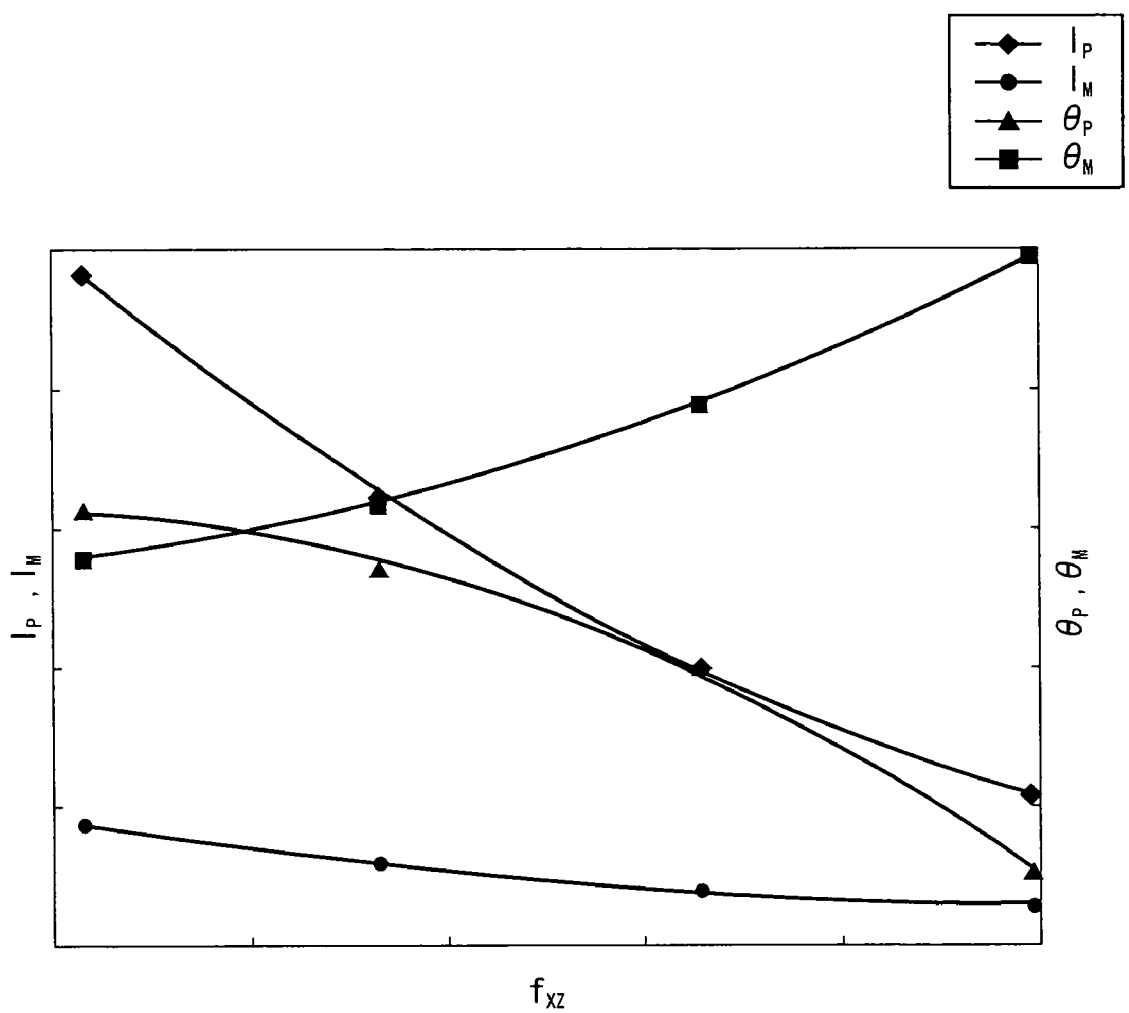
FIG. 15 is an illustration showing a relationship among a frequency of a scanning movement, intercepts of respective approximate curves and angles in the above exemplary embodiment.

FIG. 15 shows a relationship among the frequency $f_{XZ}$ of the scanning movement, the intercepts $I_P$ and $I_M$ of the respective approximate curves $AP_P$ and $AP_M$ and the angles $\theta_P$ and $\theta_M$. Specifically, FIG. 15 shows the intercepts $I_P$ and $I_M$ and the angles $\theta_P$ and $\theta_M$ when the phase difference $\phi$ is measured at a constant measurement position while varying the velocity of the scanning movement. In FIG. 15, rhombus dots represent the intercept $I_P$, circular dots represent the intercept $I_M$, triangles represent the angle $\theta_P$ and rectangular dots represent the angle $\theta_M$.

As shown in FIG. 15, the intercepts $I_P$ and $I_M$ and the angles $\theta_P$ and $\theta_M$ vary in accordance with the increase in the frequency $f_{XZ}$ of the scanning movement. Accordingly, the $I_P$ and $I_M$ and the angles $\theta_P$ and $\theta_M$ can be represented by the following formula (21) that is modeled as a quadratic expression of the frequency $f_{XZ}$.

$$\begin{pmatrix} I_P \\ I_M \\ \theta_P \\ \theta_M \end{pmatrix} = \begin{pmatrix} MI_{XZ2P} & MI_{XZ1P} & MI_{XZ0P} \\ MI_{XZ2M} & MI_{XZ1M} & MI_{XZ0M} \\ M\theta_{XZ2P} & M\theta_{XZ1P} & M\theta_{XZ0P} \\ M\theta_{XZ2M} & M\theta_{XZ1M} & M\theta_{XZ0M} \end{pmatrix} \begin{pmatrix} f_{XZ}^2 \\ f_{XZ} \\ 1 \end{pmatrix} \quad (21)$$

Further, on account of the structure of the slide mechanism 24, since the coefficient vector multiplied with the frequency $f_{XZ}$ varies in the formula (21) depending on the scale value $S(s_X, s_Z)$ as mentioned above, the coefficient vector is represented by the following formula (22) that is modeled as a quadratic expression of the scale value S.

$$\begin{pmatrix} MI_{XZ2P} \\ MI_{XZ1P} \\ MI_{XZ0P} \\ MI_{XZ2M} \\ MI_{XZ1M} \\ MI_{XZ0M} \\ M\theta_{XZ2P} \\ M\theta_{XZ1P} \\ M\theta_{XZ0P} \\ M\theta_{XZ2M} \\ M\theta_{XZ1M} \\ M\theta_{XZ0M} \end{pmatrix} = \begin{pmatrix} MI_{XZ2P\_8} & MI_{XZ2P\_7} & MI_{XZ2P\_6} & MI_{XZ2P\_5} & MI_{XZ2P\_4} & MI_{XZ2P\_3} & MI_{XZ2P\_2} & MI_{XZ2P\_1} & MI_{XZ2P\_0} \\ MI_{XZ1P\_8} & MI_{XZ1P\_7} & MI_{XZ1P\_6} & MI_{XZ1P\_5} & MI_{XZ1P\_4} & MI_{XZ1P\_3} & MI_{XZ1P\_2} & MI_{XZ1P\_1} & MI_{XZ1P\_0} \\ MI_{XZ0P\_8} & MI_{XZ0P\_7} & MI_{XZ0P\_6} & MI_{XZ0P\_5} & MI_{XZ0P\_4} & MI_{XZ0P\_3} & MI_{XZ0P\_2} & MI_{XZ0P\_1} & MI_{XZ0P\_0} \\ MI_{XZ2M\_8} & MI_{XZ2M\_7} & MI_{XZ2M\_6} & MI_{XZ2M\_5} & MI_{XZ2M\_4} & MI_{XZ2M\_3} & MI_{XZ2M\_2} & MI_{XZ2M\_1} & MI_{XZ2M\_0} \\ MI_{XZ1M\_8} & MI_{XZ1M\_7} & MI_{XZ1M\_6} & MI_{XZ1M\_5} & MI_{XZ1M\_4} & MI_{XZ1M\_3} & MI_{XZ1M\_2} & MI_{XZ1M\_1} & MI_{XZ1M\_0} \\ MI_{XZ0M\_8} & MI_{XZ0M\_7} & MI_{XZ0M\_6} & MI_{XZ0M\_5} & MI_{XZ0M\_4} & MI_{XZ0M\_3} & MI_{XZ0M\_2} & MI_{XZ0M\_1} & MI_{XZ0M\_0} \\ M\theta_{XZ2P\_8} & M\theta_{XZ2P\_7} & M\theta_{XZ2P\_6} & M\theta_{XZ2P\_5} & M\theta_{XZ2P\_4} & M\theta_{XZ2P\_3} & M\theta_{XZ2P\_2} & M\theta_{XZ2P\_1} & M\theta_{XZ2P\_0} \\ M\theta_{XZ1P\_8} & M\theta_{XZ1P\_7} & M\theta_{XZ1P\_6} & M\theta_{XZ1P\_5} & M\theta_{XZ1P\_4} & M\theta_{XZ1P\_3} & M\theta_{XZ1P\_2} & M\theta_{XZ1P\_1} & M\theta_{XZ1P\_0} \\ M\theta_{XZ0P\_8} & M\theta_{XZ0P\_7} & M\theta_{XZ0P\_6} & M\theta_{XZ0P\_5} & M\theta_{XZ0P\_4} & M\theta_{XZ0P\_3} & M\theta_{XZ0P\_2} & M\theta_{XZ0P\_1} & M\theta_{XZ0P\_0} \\ M\theta_{XZ2M\_8} & M\theta_{XZ2M\_7} & M\theta_{XZ2M\_6} & M\theta_{XZ2M\_5} & M\theta_{XZ2M\_4} & M\theta_{XZ2M\_3} & M\theta_{XZ2M\_2} & M\theta_{XZ2M\_1} & M\theta_{XZ2M\_0} \\ M\theta_{XZ1M\_8} & M\theta_{XZ1M\_7} & M\theta_{XZ1M\_6} & M\theta_{XZ1M\_5} & M\theta_{XZ1M\_4} & M\theta_{XZ1M\_3} & M\theta_{XZ1M\_2} & M\theta_{XZ1M\_1} & M\theta_{XZ1M\_0} \\ M\theta_{XZ0M\_8} & M\theta_{XZ0M\_7} & M\theta_{XZ0M\_6} & M\theta_{XZ0M\_5} & M\theta_{XZ0M\_4} & M\theta_{XZ0M\_3} & M\theta_{XZ0M\_2} & M\theta_{XZ0M\_1} & M\theta_{XZ0M\_0} \end{pmatrix} \begin{pmatrix} s_X^2 \cdot s_Z^2 \\ s_X^2 \cdot s_Z \\ s_X \cdot s_Z^2 \\ s_X^2 \\ s_X \cdot s_Z \\ s_Z^2 \\ s_X \\ s_Z \\ 1 \end{pmatrix} \quad (22)$$

Here, since the intercepts $I_P$ and $I_M$, the angles $\theta_P$ and $\theta_M$, the frequency $f_{XZ}$ of the scanning movement and the scale value S are known in the formulae (21) and (22), the coefficient vector $M_{XZ}$ to be multiplied with the scale value S based on the phase difference $\phi_{XZ}$ in the formula (22) can be calculated.

Further, the coefficient vectors $M_{XY}$ and $M_{YZ}$ to be multiplied with the scale value S based on the phase differences $\phi_{XY}$ and $\phi_{YZ}$ are calculated in the same manner as the calculation of the coefficient vector $M_{XZ}$, thereby calculating all of the coefficient vectors $M_{XZ}$, $M_{XY}$ and $M_{YZ}$ in the formulae (19-1) to (19-3).

Then, as shown in the formulae (19-1) to (19-3), the acceleration correction-amount calculating unit 83 calculates a coefficient vector $M_f$ based on the calculated coefficient vectors $M_{XZ}$, $M_{XY}$ and $M_{YZ}$ and the scale value S acquired by the displacement acquiring unit 52. Further, as shown in the formulae (17) and (18), the phase difference correction-amount calculating unit 83 calculates the phase-difference correction-amount $C\phi$ based on the calculated coefficient vector $M_f$, the frequency $f(f_{XY}, f_{XZ}, f_{YZ})$ calculated by the frequency-estimating unit 72 and the swivel length $L(l_X, l_Y, l_Z)$.

Here, as described above, the formula (18) is classified by the conditional expressions (18-1) to (18-3). This is because the inclinations $S_P$ and $S_M$ of different approximate linear lines are derived in accordance with the difference in the orientation of the probe 21 (i.e. when the probe 21 is oriented in the +X,Y,Z-axis directions and when the probe 21 is oriented in the −X,Y,Z-axis directions).

Figure 16:
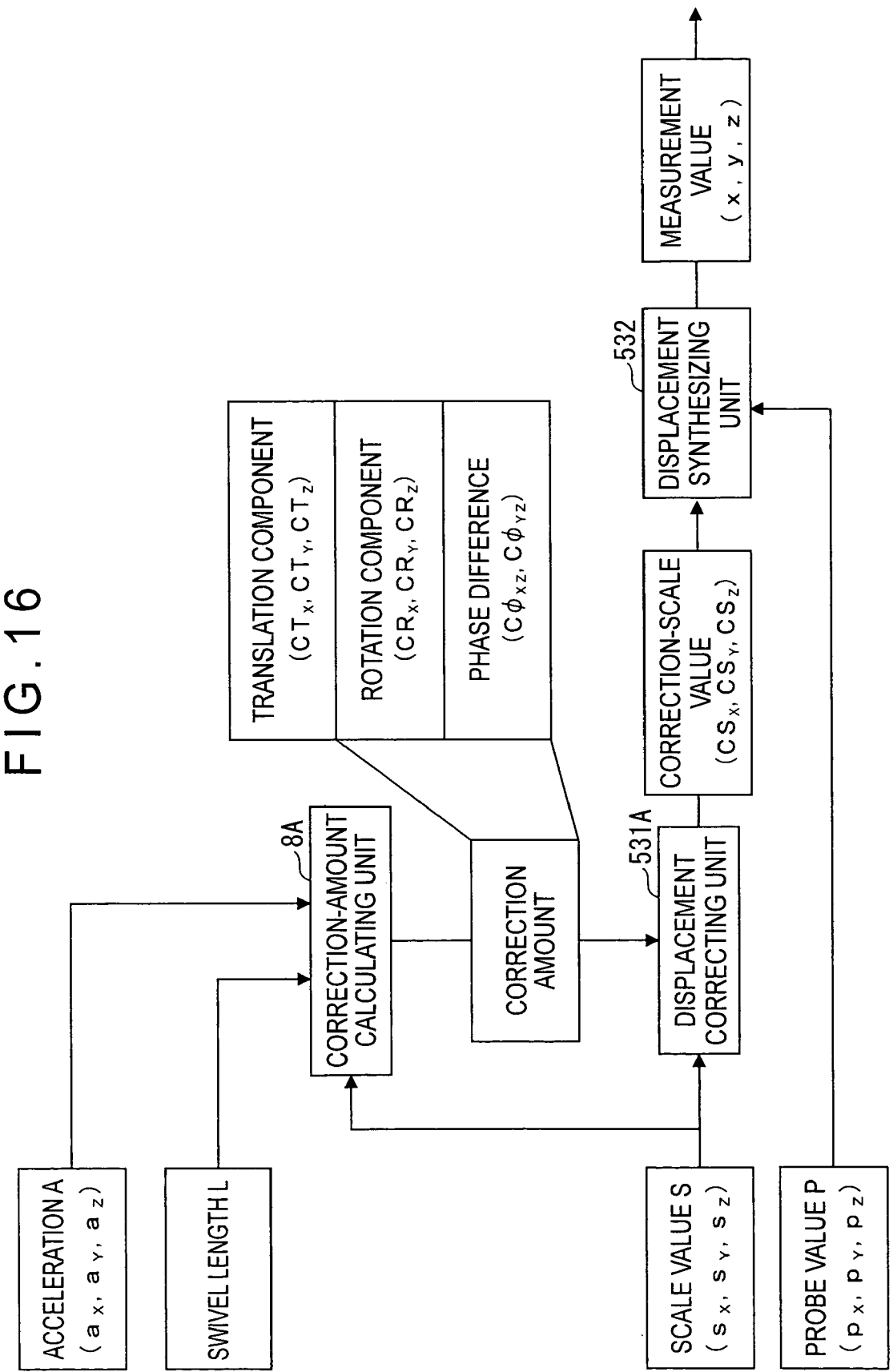
FIG. 16 is an illustration showing a relationship among a correction-amount calculating unit, displacement correcting unit and displacement synthesizing unit in the above exemplary embodiment.

FIG. 16 is an illustration showing a relationship among a correction-amount calculating unit 8A, a displacement correcting unit 531A and a displacement synthesizing unit 532.

As described above, the correction-amount calculating unit 8A calculates the correction amount (the translation-correction amount CT, the rotation-correction amount CR and the phase-difference correction amount $C\phi$) based on the acceleration A, the swivel length L and the scale value S (see FIG. 16).

As shown in FIG. 16, the displacement correcting unit 531A corrects the scale value S acquired by the displacement acquiring unit 52 based on the correction amount calculated by the correction-amount calculating unit 8A.

The correction using the phase-difference correction-amount $C\phi$ may be made while setting one of the X, Y and Z-axes as a reference axis and by correcting the phase difference with the other two axes. The correction accuracy can be enhanced by changing the reference axis in accordance with the absolute value of the phase-difference correction-amount $C\phi(C\phi_{XY}, C\phi_{XZ}, C\phi_{YZ})$. Specifically, when the absolute value of the $C\phi_{XY}$ is the smallest, the scale value S is corrected based on the following formula (23-1) while setting the Z-axis as the reference axis. When the absolute value of the $C\phi_{XZ}$ is the smallest, the scale value S is corrected based on the following formula (23-2) while setting the Y-axis as the reference axis. When the absolute value of the $C\phi_{YZ}$ is the smallest, the scale value S is corrected based on the following formula (23-3) while setting the X-axis as the reference axis.

$$\begin{pmatrix} C\phi S_X \\ C\phi S_Y \\ C\phi S_Z \end{pmatrix} = \begin{pmatrix} \cos(C\phi_{XZ}) & 0 & 0 \\ 0 & \cos(C\phi_{YZ}) & 0 \\ \sin(C\phi_{XZ}) & \sin(C\phi_{YZ}) & 1 \end{pmatrix} \begin{pmatrix} s_X \\ s_Y \\ s_Z \end{pmatrix} \quad (23\text{-}1)$$

-continued $$\begin{pmatrix} C\phi S_X \\ C\phi S_Y \\ C\phi S_Z \end{pmatrix} = \begin{pmatrix} \cos(C\phi_{XY}) & 0 & 0 \\ \sin(C\phi_{XY}) & 1 & \sin(-C\phi_{YZ}) \\ 0 & 0 & \cos(-C\phi_{YZ}) \end{pmatrix} \begin{pmatrix} s_X \\ s_Y \\ s_Z \end{pmatrix} \quad (23\text{-}2)$$

$$\begin{pmatrix} C\phi S_X \\ C\phi S_Y \\ C\phi S_Z \end{pmatrix} = \begin{pmatrix} 1 & \sin(-C\phi_{XY}) & \sin(-C\phi_{XZ}) \\ 0 & \cos(-C\phi_{XY}) & 0 \\ 0 & 0 & \cos(-C\phi_{XZ}) \end{pmatrix} \begin{pmatrix} s_X \\ s_Y \\ s_Z \end{pmatrix} \quad (23\text{-}3)$$

Incidentally, as shown in FIG. 16, the displacement correcting unit 531A corrects the scale value S based on the formula (23-1) while setting the Z-axis as the reference axis. The displacement correcting unit 531A further corrects a phase-difference correction-scale value $C\phi S(C\phi S_X, C\phi S_Y, C\phi S_Z)$ corrected based on the phase-difference correction-amount $C\phi$, based on the translation-correction amount CT and the rotation-correction amount CR according to the following formula (24).

$$\left.\begin{array}{l} CS_X = C\phi S_X + CT_X + CR_X \\ CS_Y = C\phi S_Y + CT_Y + CR_Y \\ CS_Z = C\phi S_Z + CT_Z + CR_Z \end{array}\right\} \quad (24)$$

Then, the displacement synthesizing unit 532 synthesizes a corrected scale value CS corrected by the displacement correcting unit 531A and the probe value P acquired by the displacement acquiring unit 52 to calculate the measurement value (x, y, z).

Here, as shown in FIGS. 11A, 11B and 12, all of the measurement results obtained by measuring the surface profile of the object W after correcting the scale value S by the displacement correcting unit 531 of the first exemplary embodiment exhibited an ellipsoidal shape. This is because an error occurs on the measurement value of the coordinate measuring machines 1 and 1A provided with a plurality of movement axes for scanning movement of the probe 21 being influenced by the phase difference between the respective movement axes on account of a difference in the response characteristics of the respective movement axes.

Figure 17A:
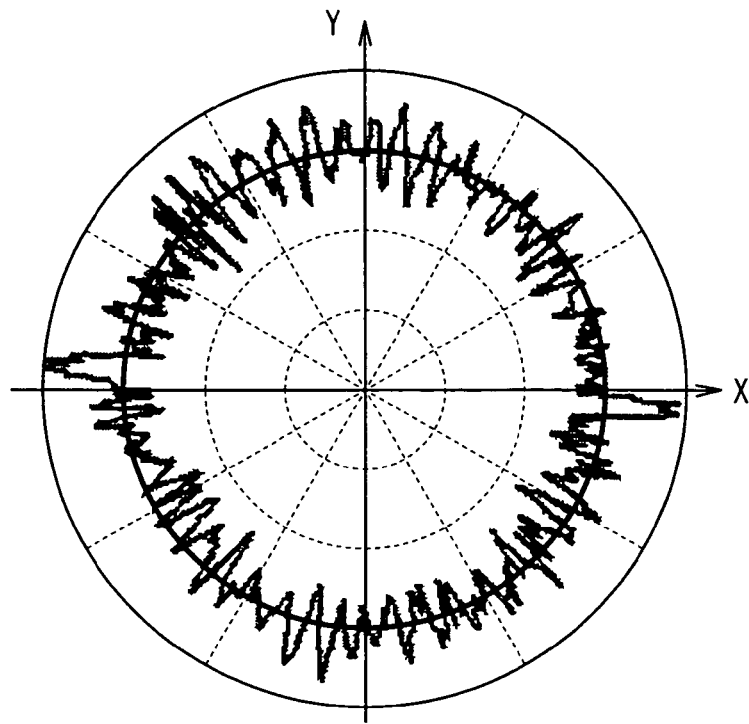
FIG. 17A is an illustration showing a measurement result when the surface profile of the object is measured after correcting the scale value by the displacement correcting unit in the above exemplary embodiment.
Figure 17B:
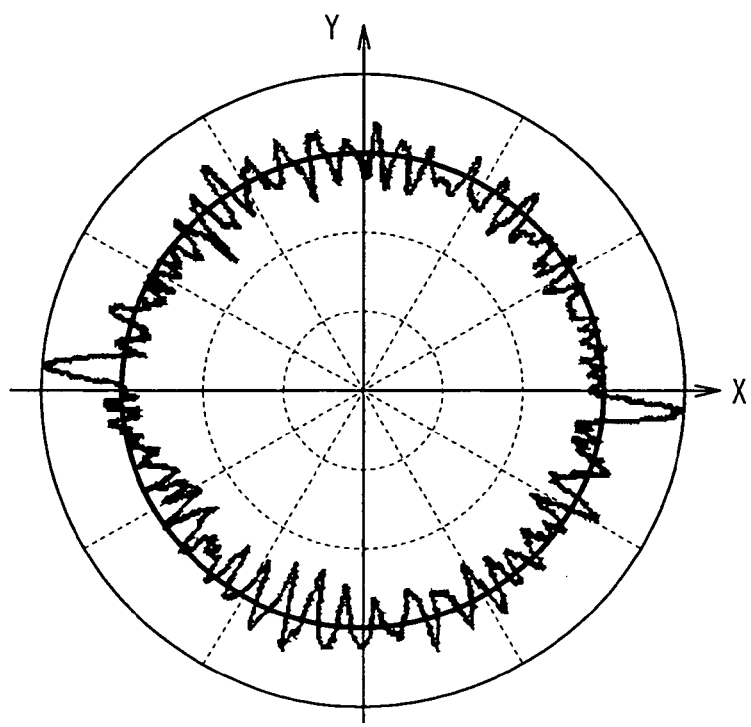
FIG. 17B is an illustration showing a measurement result when a surface profile of an object is measured after correcting the scale value by the displacement correcting unit in the above exemplary embodiment.
Figure 18:
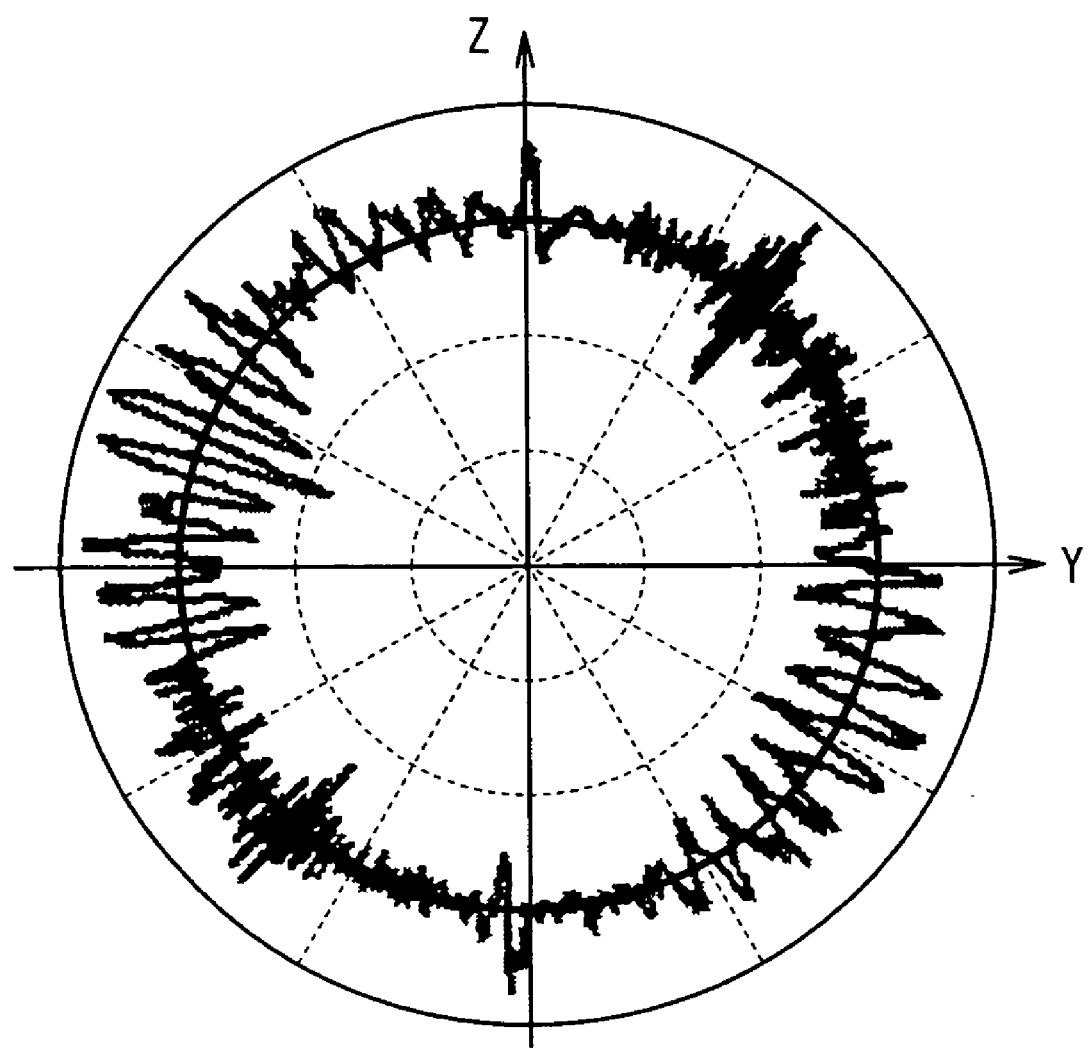
FIG. 18 is an illustration showing a measurement result when the surface profile of the object is measured after correcting the scale value by the displacement correcting unit in the above exemplary embodiment.

FIGS. 17A, 17B and 18 illustrate the measurement results when the surface profile of the object W was measured while correcting the scale value S by the displacement correcting unit 531A. FIGS. 17A, 17B and 18 respectively correspond to FIGS. 11A, 11B and 12.

As shown in FIGS. 17A, 17B and 18, the respective measurement results exhibited substantially the same shape as the profile data in any of the instances. Further, the respective measurement results exhibited approximately circular shape in any of the instances. This is because the position error of the measurement piece 211A was corrected based on the phase-difference correction-amount $C\phi$ calculated by the correction-amount calculating unit 8A.

According to this exemplary embodiment, following advantages and effects can be attained as well as the same advantages and effects in the above first exemplary embodiment.

(3) The coordinate measuring machine 1A includes the phase difference correction-amount calculating unit 83 that calculates the phase-difference correction-amount $C\phi$ for correcting the phase difference between respective movement axes based on the frequency f of the scanning movement when the probe 21 is circulated at a constant angular velocity, so that the phase difference between the respective movement axes can be appropriately corrected and the error in the measurement value can be further properly corrected.

Incidentally, the scope of the invention is not limited to the above exemplary embodiments, but includes modifications and improvements that are compatible with an object of the invention.

In the above exemplary embodiments, the coordinate measuring machines 1 and 1A include the contact-type probe 21 provided with the measurement piece 211A to be in contact with the surface of the object W. However, the coordinate measuring machine may be provided with a non-contact probe such as a laser device and a camera. In other words, it is sufficient for the coordinate measuring machine to be provided with a probe having a measurement piece.

The moving mechanism 22 includes the three movement axes for moving the probe 21 in the mutually orthogonal X, Y, Z-axes directions. In contrast, the moving mechanism may be provided with one or two movement axes, which may not be orthogonal with each other. In sum, any moving mechanism may be used as long as the prove can conduct the scanning movement.

In the above exemplary embodiments, the correction-amount calculating units 8 and 8A calculate the translation-correction amount CT, the rotation-correction amount CR and the phase-difference correction-amount $C\phi$ by modeling the acceleration A, the frequency f, the swivel length L and the scale value S in polynomial equations. In contrast, the correction-amount calculating unit may calculate the translation-correction amount, the rotation-correction amount and the phase-difference correction-amount by modeling with a spline function and the like, and may calculate the translation-correction amount, the rotation-correction amount and the phase-difference correction-amount with parameter(s) different from acceleration, frequency, swivel length and scale value. In sum, any arrangement is possible for the correction-amount calculating unit as long as the correction-amount calculating unit can calculate the translation-correction amount, the rotation-correction amount and the phase-difference correction-amount based on parameter(s) such as acceleration that can be associated with the correction amount.

The correction-amount calculating units 8 and 8A calculate the correction amount based on the acceleration A and the frequency f calculated by the movement-estimating unit 7 and 7A. However, the correction-amount calculating unit may calculate the correction amount based on acceleration and the like detected by an acceleration sensor, position sensor and the like. However, when acceleration and the like is detected with the use of such sensor(s), a sampling error occurs when the output signal from the sensor(s) is sampled. In addition, it is not easy to provide the sensor(s) on the probe. Accordingly, the arrangement of the above exemplary embodiment in which the correction amount is calculated based on acceleration and the like calculated by the movement-estimating unit is preferable.

In the above exemplary embodiments, the coordinate measuring machines 1 and 1A include the probe 21 provided with the rotation mechanism 213 for changing the attitude of the probe 21 by rotating the support mechanism 212 and the stylus 211. On the other hand, the coordinate measuring machine may have a probe not provided with the rotation mechanism. In this instance, the reference point may be set at a base point of the probe.

In the second exemplary embodiment, the phase difference correction-amount calculating unit 83 calculates the phase-difference correction-amount $C\phi$ by coordinate conversion of the scale value S. On the other hand, the phase difference correction-amount calculating unit may calculate the phase difference correction-amount for correcting, for instance, time delay of the respective movement axes. In other words, any arrangement is possible as long as the phase difference correction-amount calculating unit can calculate the phase difference correction-amount for correcting the phase difference between the respective movement axes.

The entire disclosure of Japanese Patent Application No. 2008-125980, filed May 13, 2008, is expressly incorporated by reference herein.

What is claimed is:

1. A coordinate measuring instrument, comprising:
a probe that has a measurement piece that moves along a surface of an object;
a moving mechanism that holds the probe and effects a scanning movement of the probe; and a controller that controls the moving mechanism,
the controller comprising:
 a displacement acquiring unit that acquires a displacement of the moving mechanism;
 a correction-amount calculating unit that calculates a correction amount for correcting a position error of the measurement piece caused by a deformation of the moving mechanism on account of an acceleration during the scanning movement of the probe; and
 a correcting unit that corrects the position error of the measurement piece based on the displacement of the moving mechanism acquired by the displacement acquiring unit and the correction amount calculated by the correction-amount calculating unit,
the correction-amount calculating unit separately calculating:
 a translation-correction amount for correcting a translation error of the probe at a reference point on the probe; and
 a rotation-correction amount for correcting a rotation error of the probe generated according to a rotation angle of the probe around the reference point and a length of the probe from the reference point to the measurement piece,
 wherein the translation-correction amount does not depend on the length of the probe and the rotation angle of the probe.

2. The coordinate measuring instrument according to claim 1, wherein the correction-amount calculating unit separately calculates at least one of the translation-correction amount and the rotation-correction amount based on an acceleration of the scanning movement of the probe.

3. The coordinate measuring instrument according to claim 1, wherein
the moving mechanism includes a plurality of movement axes along which the scanning movement of the probe is effected, and
the correction-amount calculating unit includes a phase difference correction-amount calculating unit that calculates a phase-difference correction-amount for correcting a phase difference between the respective movement axes.

4. The coordinate measuring instrument according to claim 3, wherein the phase difference correction-amount calculating unit calculates the phase difference correction-amount based on a frequency of the scanning movement when the probe is circulated at a constant angular velocity.

5. The coordinate measuring instrument according to claim 2, wherein
the moving mechanism includes a plurality of movement axes along which the scanning movement of the probe is effected, and
the correction-amount calculating unit includes a phase difference correction amount calculating unit that calculates a phase-difference correction-amount for correcting a phase difference between the movement axes.

6. The coordinate measuring instrument according to claim 5, wherein the phase difference correction-amount calculating unit calculates the phase-difference correction-amount based on a frequency of the scanning movement when the probe is circulated at a constant angular velocity.

7. The coordinate measuring instrument according to claim 1, wherein the correction-amount calculating unit calculates the correction amount based on the displacement of the moving mechanism acquired by the displacement acquiring unit.

8. The coordinate measuring instrument according to claim 2, wherein the correction-amount calculating unit calculates the correction amount based on the displacement of the moving mechanism acquired by the displacement acquiring unit.

9. The coordinate measuring instrument according to claim 3, wherein the correction-amount calculating unit calculates the correction amount based on the displacement of the moving mechanism acquired by the displacement acquiring unit.

10. The coordinate measuring instrument according to claim 4, wherein the correction-amount calculating unit calculates the correction amount based on the displacement of the moving mechanism acquired by the displacement acquiring unit.

11. The coordinate measuring instrument according to claim 5, wherein the correction-amount calculating unit calculates the correction amount based on the displacement of the moving mechanism acquired by the displacement acquiring unit.

12. The coordinate measuring instrument according to claim 6, wherein the correction-amount calculating unit calculates the correction amount based on the displacement of the moving mechanism acquired by the displacement acquiring unit.

* * * * *